United States Patent
He et al.

(10) Patent No.: US 11,589,405 B2
(45) Date of Patent: Feb. 21, 2023

(54) METHOD FOR USING RADIO ACCESS TECHNOLOGY, USER EQUIPMENT, AND SYSTEM

(71) Applicant: HUAWEI TECHNOLOGIES CO., LTD., Shenzhen (CN)

(72) Inventors: Yanzhao He, Beijing (CN); Li Shen, Beijing (CN); Yuan-Hao Lan, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 214 days.

(21) Appl. No.: 16/958,321

(22) PCT Filed: Dec. 28, 2017

(86) PCT No.: PCT/CN2017/119486
§ 371 (c)(1),
(2) Date: Jun. 26, 2020

(87) PCT Pub. No.: WO2019/127242
PCT Pub. Date: Jul. 4, 2019

(65) Prior Publication Data
US 2021/0068182 A1 Mar. 4, 2021

(51) Int. Cl.
*H04W 76/15* (2018.01)
*H04W 36/00* (2009.01)
(Continued)

(52) U.S. Cl.
CPC ........... *H04W 76/15* (2018.02); *H04W 16/14* (2013.01); *H04W 36/0069* (2018.08); *H04W 72/1215* (2013.01); *H04W 88/06* (2013.01)

(58) Field of Classification Search
CPC ..... H04W 72/04; H04W 88/08; H04W 76/00; H04W 76/15; H04W 16/14; H04W 72/1215; H04W 88/06
See application file for complete search history.

(56) References Cited

U.S. PATENT DOCUMENTS 10,225,875 B2 *  3/2019  Seo .................... H04W 8/24
10,673,600 B2 *  6/2020  Lee .................... H04L 5/0098
(Continued)

FOREIGN PATENT DOCUMENTS

CN   105430677 A   3/2016
CN   107454998 A   12/2017
(Continued)

OTHER PUBLICATIONS

R4-1712858 Qualcomm Incorporated, "On RRM requirement for LAA/WiFi Hardware Sharing", 3GPP TSG-RAN WG4 #85, Reno, USA, Nov. 27-Dec. 1, 2017, total 3 pages.
(Continued)

*Primary Examiner* — Hassan A Phillips
*Assistant Examiner* — Prenell P Jones
(74) *Attorney, Agent, or Firm* — Hauptman Ham, LLP

(57) ABSTRACT

A method includes determining, by a user equipment (UE), to use a first radio access technology, and triggering, by the UE, a first event to disable a second radio access technology while the UE currently uses the second radio access technology. The first event indicates that a base station fails to configure a secondary cell or instructs the base station to delete a configured secondary cell. The secondary cell is a secondary cell of the second radio access technology on the unlicensed spectrum.

20 Claims, 9 Drawing Sheets

(51) Int. Cl.
*H04W 16/14* (2009.01)
*H04W 72/12* (2023.01)
*H04W 88/06* (2009.01)

(56) References Cited

U.S. PATENT DOCUMENTS

| | | | | |
|---|---|---|---|---|
| 2014/0098790 | A1* | 4/2014 | Xue | H04M 3/00 370/331 |
| 2015/0163823 | A1* | 6/2015 | Sadek | H04W 16/14 370/336 |
| 2016/0066232 | A1* | 3/2016 | Wang | H04W 36/30 370/332 |
| 2016/0128080 | A1 | 5/2016 | Verma et al. | |
| 2016/0212629 | A1* | 7/2016 | Wei | H04W 36/0085 |
| 2016/0227416 | A1* | 8/2016 | Suzuki | H04W 74/004 |
| 2016/0227428 | A1* | 8/2016 | Novlan | H04W 24/10 |
| 2016/0227524 | A1* | 8/2016 | Choi | H04L 5/0053 |
| 2016/0301555 | A1* | 10/2016 | Nory | H04L 1/0052 |
| 2017/0041042 | A1* | 2/2017 | Wei | H04L 5/001 |
| 2017/0111217 | A1* | 4/2017 | Kim | H04L 27/2602 |
| 2017/0142746 | A1* | 5/2017 | Koorapaty | H04W 36/08 |
| 2017/0202043 | A1* | 7/2017 | Seo | H04W 76/14 |
| 2017/0311194 | A1* | 10/2017 | Martin | H04W 24/10 |
| 2018/0013500 | A1* | 1/2018 | Liao | H04W 24/08 |
| 2018/0054333 | A1* | 2/2018 | Rinne | H04L 25/03866 |
| 2018/0070405 | A1* | 3/2018 | Yi | H04L 5/0053 |
| 2018/0077688 | A1* | 3/2018 | Yi | H04W 76/28 |
| 2018/0263048 | A1* | 9/2018 | Ingale | H04W 72/1215 |
| 2018/0368099 | A1* | 12/2018 | Chen | H04W 48/18 |
| 2018/0376434 | A1* | 12/2018 | Cui | H04W 72/1289 |
| 2019/0182675 | A1* | 6/2019 | Pu | H04W 24/10 |
| 2019/0274164 | A1* | 9/2019 | Zhang | H04W 74/0808 |
| 2020/0029356 | A1* | 1/2020 | Choi | H04L 5/001 |
| 2020/0059841 | A1* | 2/2020 | Zhang | H04W 16/14 |
| 2020/0413426 | A1* | 12/2020 | Park | H04L 5/0094 |

FOREIGN PATENT DOCUMENTS

| | | | | |
|---|---|---|---|---|
| CN | 107493589 | A | 12/2017 | |
| EP | 3491874 | A1 | 6/2019 | |
| WO | 2017028336 | * | 2/2017 | ........... H04W 24/08 |
| WO | 2017048024 | A1 | 3/2017 | |
| WO | 2017048380 | A1 | 3/2017 | |
| WO | 2018058112 | A1 | 3/2018 | |

OTHER PUBLICATIONS

RP-141646 Ericsson et al., "Study on Licensed-Assisted Access using LTE", 3GPP TSG RAN Meeting #65, Edinburgh, Scotland, Sep. 9-12, 2014, total 8 pages.
3GPP TR 36.913 V14.0.0 (Mar. 2017), 3rd Generation Partnership Project;Technical Specification Group Radio Access Network;Requirements for further advancements for Evolved Universal Terrestrial Radio Access (E-UTRA) (LTE-Advanced)(Release 14), total 15 pages.
3GPP TS 36.331 V14.4.0 (Sep. 2017), 3rd Generation Partnership Project;Technical Specification Group Radio Access Network;Evolved Universal Terrestrial Radio Access (E-UTRA);Radio Resource Control (RRC);Protocol specification (Release 14), total 753 pages.
3GPP TS 36.306 V14.4.0 (Sep. 2017), 3rd Generation Partnership Project;Technical Specification Group Radio Access Network;Evolved Universal Terrestrial Radio Access (E-UTRA);User Equipment (UE) radio access capabilities Release 14), total 80 pages.
International Search Report issued in corresponding International Application No. PCT/CN2017/119486, dated Sep. 18, 2018, pp. 1-9, State Intellectual Property Office of the P.R. of China, Beijing, China.
R2-1701756 Apple et al., "Concurrent LAA/Wi-Fi Using RX Sharing", 3GPP TSG-RAN WG2 #97, Athens, Greece, Feb. 13-17, 2017, total 3 pages.
European Search Report issued in corresponding European Application No. 17936395.7, dated Oct. 22, 2020, pp. 1-11, European Patent Office, Munich, Germany.

* cited by examiner

METHOD FOR USING RADIO ACCESS TECHNOLOGY, USER EQUIPMENT, AND SYSTEM

This application is a national stage of International Application No. PCT/CN2017/119486, filed on Dec. 28, 2017.

TECHNICAL FIELD

This application relates to the communications field, and in particular, to a method for using a radio access technology, user equipment (user equipment, UE), and a system.

BACKGROUND

With continuous development of communications technologies, UE may simultaneously support a plurality of radio access technologies. For example, the UE may support both a wireless fidelity (Wireless-Fidelity, Wi-Fi) 5G technology and a licensed assisted access (licensed assisted access, LAA) technology. The Wi-Fi 5G technology is a Wi-Fi technology using a radio wave band of 5 GHz.

Currently, both the Wi-Fi 5G technology and the LAA technology can use a band on an unlicensed spectrum, but the band on the unlicensed spectrum is usually preempted and used by the UE itself. Therefore, in a scenario in which the UE supports both the Wi-Fi 5G technology and the LAA technology, to avoid mutual interference resulting from using a same band by the Wi-Fi 5G technology and the LAA technology, the UE may disable (disable) the LAA technology when the UE uses the Wi-Fi 5G technology, and the UE may enable (enable) the LAA technology when the UE no longer uses the Wi-Fi 5G technology.

Generally, only when reporting a capability of the UE to an evolved NodeB (evolved node B, eNB) in a process of attaching (attach) to an LTE system, the UE can instruct the NodeB to delete an LAA capability and an LAA-related carrier aggregation (carrier aggregation, CA) combination, so as to disable (disable) the LAA technology. Therefore, when the UE uses the Wi-Fi 5G technology, the UE may first detach (detach) from the long term evolution (long term evolution, LTE) system, and then request to attach (attach) to the LTE system again, so as to disable (disable) the LAA technology when the UE is re-attaching to the LTE system. However, the LAA technology may use both an unlicensed spectrum and a licensed spectrum, and the UE detaches from the LTE system in both the foregoing processes of enabling and disabling the LAA technology. Therefore, the deleted LAA capability and LAA-related CA combination include not only information related to the unlicensed spectrum but also information related to the licensed spectrum. Deleting the information related to the licensed spectrum results in interruption of a wireless connection between the UE and the LTE system, thereby interrupting a cellular service of the UE in the LTE system.

SUMMARY

This application provides a method for using a radio access technology, user equipment, and a system, to ensure service continuity for UE when the UE simultaneously supports a plurality of radio access technologies using an unlicensed spectrum.

To achieve the foregoing objective, the following technical solutions are used in this application.

According to a first aspect, a method for using a radio access technology is provided. UE supports a first radio access technology and a second radio access technology. Both the first radio access technology and the second radio access technology use an unlicensed spectrum. The second radio access technology is a carrier aggregation technology using the unlicensed spectrum. The method for using a radio access technology includes: determining to use the first radio access technology; and when the UE currently uses the second radio access technology, triggering, by the UE, a first event used to indicate that a base station is unable to configure a secondary cell (the secondary cell is a secondary cell of the second radio access technology on the unlicensed spectrum), or used to instruct the base station to delete the configured secondary cell, so as to disable the second radio access technology.

In this application, the UE may trigger the first event so that the base station cannot configure the secondary cell of the second radio access technology on the unlicensed spectrum or deletes the configured secondary cell, so as to disable the second radio access technology. However, the UE may still properly perform cellular communication in a primary cell on a licensed spectrum, that is, the UE is not disconnected from the licensed spectrum. Therefore, when the UE simultaneously supports a plurality of radio access technologies using an unlicensed spectrum, service continuity can be ensured for the UE when the UE switches from one radio access technology to another radio access technology.

In a first optional implementation of the first aspect, after the determining, by the UE, to use the first radio access technology and before the triggering, by the UE, a first event, the UE may further determine a status of using the second radio access technology by the UE. Specifically, a method for triggering, by the UE, the first event may include: triggering, by the UE, the first event based on the status of the second radio access technology. In this way, the UE may trigger different first events depending on different statuses of the second radio access technology used by the UE.

In a second optional implementation of the first aspect, the status of the second radio access technology is that the secondary cell has been configured but not activated, that the secondary cell has been configured and activated, or that the secondary cell is not configured.

In a third optional implementation of the first aspect, the status of using the second radio access technology by the UE is that the secondary cell has been configured but not activated or that the secondary cell has been configured and activated. The first event is used to indicate that signal quality of the secondary cell is lower than a first threshold. Specifically, a method for triggering, by the UE, the first event based on the status of using the second radio access technology by the UE may include: sending, by the UE, the first event to the base station when the status of the second radio access technology is that the secondary cell has been configured but not activated or that the secondary cell has been configured and activated, so that the base station deletes the secondary cell.

When the status of the second radio access technology is that the secondary cell has been configured but not activated or that the secondary cell has been configured and activated, the base station has configured the secondary cell. Generally, when the signal quality of the secondary cell is lower than the first threshold, it indicates that the secondary cell cannot properly serve the UE. In this case, the base station may delete the secondary cell, that is, may disable the second radio access technology.

In a fourth optional implementation of the first aspect, the status of using the second radio access technology by the UE is that the secondary cell is not configured, and the first event is used to indicate that the UE prohibits sending a result of measuring a first cell (the first cell is a serving cell of the second radio access technology) by the UE to the base station.

Specifically, a method for triggering, by the UE, the first event based on the status of using the second radio access technology by the UE may include: when the status is that the secondary cell is not configured, receiving, by the UE, a first configuration message that is sent by the base station and that is used to indicate that the first cell has been configured as a neighboring cell of a primary cell (the primary cell is a primary serving cell, among serving cells of the second radio access technology, on which the UE currently camps, and the first cell is different from the primary cell); receiving a first measurement instruction message that is sent by the base station and that is used to instruct the UE to measure signal quality of the neighboring cell; and prohibiting sending a result of measuring the signal quality of the neighboring cell by the UE to the base station.

The UE prohibits sending the result of measuring the signal quality of the neighboring cell by the UE to the base station, so that the base station cannot receive the result of measuring the signal quality of the neighboring cell by the UE. Because the base station cannot obtain the result of measuring the signal quality of the neighboring cell by the UE, the base station cannot configure the neighboring cell as the secondary cell.

In a fifth optional implementation of the first aspect, the status of using the second radio access technology by the UE is that the secondary cell is not configured, and the first event is used to indicate that signal quality of a first cell (the first cell is a serving cell of the second radio access technology) is lower than a first threshold.

Specifically, a method for triggering, by the UE, the first event based on the status of using the second radio access technology by the UE may include: when the status is that the secondary cell is not configured, receiving, by the UE, a second configuration message that is sent by the base station and that is used to indicate that the first cell has been configured as the secondary cell; receiving a second measurement instruction message that is sent by the base station and that is used to instruct the UE to measure signal quality of the secondary cell; and sending the first event to the base station, so that the base station deletes the secondary cell.

In this application, according to the foregoing third to fifth optional implementations, the UE may trigger different first events in different statuses, so that the base station cannot configure the secondary cell or deletes the configured secondary cell.

In a sixth optional implementation of the first aspect, a method for triggering, by the UE, the first event when the UE currently uses the second radio access technology may include: reading, by the UE, a flag bit on the UE; and triggering, by the UE, the first event when the flag bit is a first value. That the flag bit is the first value is used to indicate that the UE currently uses the second radio access technology. When the UE determines to use the first radio access technology and the UE currently uses the second radio access technology, the UE may disable the second radio access technology.

In a seventh optional implementation of the first aspect, after the triggering, by the UE, a first event, to disable the second radio access technology, the method in this embodiment of this application further includes: using, by the UE, the first radio access technology; and setting, by the UE, the flag bit to a second value, where that the flag bit is the second value is used to indicate that the UE currently uses the first radio access technology.

In an eighth optional implementation of the first aspect, a method for determining, by the UE, to use the first radio access technology may include: determining, by the UE according to a current service requirement of the UE, to use the first radio access technology. In this way, the UE may determine, according to the current service requirement of the UE, to use the first radio access technology.

In a ninth optional implementation of the first aspect, a method for determining, by the UE, to use the first radio access technology may include: determining, by the UE based on a selection operation of a user, to use the first radio access technology. In this way, the UE may determine, under the operation of the user, to use the first radio access technology.

In a tenth optional implementation of the first aspect, after the determining, by the UE, to use the first radio access technology and before the triggering, by the UE, a first event, the UE may further determine that the secondary cell has been configured.

Specifically, a method for triggering, by the UE, the first event may include: triggering, by the UE, the first event when no band is available on the unlicensed spectrum; or triggering, by the UE, the first event when a first band overlaps a second band (the first band is a band used by the first radio access technology on the unlicensed spectrum, and the second band is a band used by the second radio access technology on the unlicensed spectrum). In this way, the UE may trigger the first event when no band is available on the unlicensed spectrum or the first band used by the first radio access technology on the unlicensed spectrum overlaps the second band used by the second radio access technology on the unlicensed spectrum.

According to a second aspect, UE is provided. The UE supports a first radio access technology and a second radio access technology. Both the first radio access technology and the second radio access technology use an unlicensed spectrum. The second radio access technology is a carrier aggregation technology using the unlicensed spectrum. The UE currently uses the second radio access technology. The UE may include a determining module and a trigger module. The determining module is configured to determine to use the first radio access technology. The trigger module is configured to: after the determining module determines to use the first radio access technology, trigger a first event used to indicate that a base station is unable to configure a secondary cell (the secondary cell is a secondary cell of the second radio access technology on the unlicensed spectrum), or used to instruct the base station to delete the configured secondary cell, so as to disable the second radio access technology.

The determining module and the trigger module may support the UE in performing the method steps in the optional implementations of the first aspect. The determining module and the trigger module are obtained by logically dividing the UE, to perform the method for using a radio access technology in the first aspect and the optional implementations of the first aspect. For related descriptions and technical effects of the second aspect, refer to the related descriptions in the first aspect and the optional implementations of the first aspect. Details are not described herein again.

According to a third aspect, UE is provided. The UE includes a processor, a memory and a communications interface that are coupled to the processor, and one or more computer programs. The one or more computer programs are stored in the memory. The one or more computer programs include a computer instruction. The communications interface is configured to communicate with another device. When the computer instruction is executed by the processor, the UE is enabled to perform the method for using a radio access technology in any one of the first aspect or the optional implementations of the first aspect.

The processor, and the memory and the communications interface that are coupled to the processor may support the UE in performing the method steps in the optional implementations of the first aspect. For related descriptions and technical effects of the third aspect, refer to the related descriptions in the first aspect and the optional implementations of the first aspect. Details are not described herein again.

According to a fourth aspect, a control device is provided. The control device includes a processor and a memory. The memory is configured to store computer program code. The computer program code includes a computer instruction. When the processor executes the computer instruction, the control device performs the method for using a radio access technology in any one of the first aspect or the optional implementations of the first aspect.

According to a fifth aspect, a computer storage medium is provided. The computer storage medium includes a computer instruction. When the computer instruction is run on UE, the UE is enabled to perform the method for using a radio access technology in any one of the first aspect or the optional implementations of the first aspect.

According to a sixth aspect, a computer program product is provided. When the computer program product is run on a computer, the computer is enabled to perform the method for using a radio access technology in any one of the first aspect or the optional implementations of the first aspect.

According to a seventh aspect, a communications system is provided. The communications system includes a macro base station, a micro base station, a wireless access point, and the UE in any one of the second aspect or the optional implementations of the second aspect. The macro base station works on a licensed spectrum. The micro base station and the wireless access point work on an unlicensed spectrum. The macro base station and the micro base station perform carrier aggregation.

For details about technical effects of the fourth aspect to the seventh aspect, refer to the related descriptions of the technical effects of any one of the first aspect or the optional implementations of the first aspect. Details are not described herein again.

DESCRIPTION OF EMBODIMENTS

Figure 1:
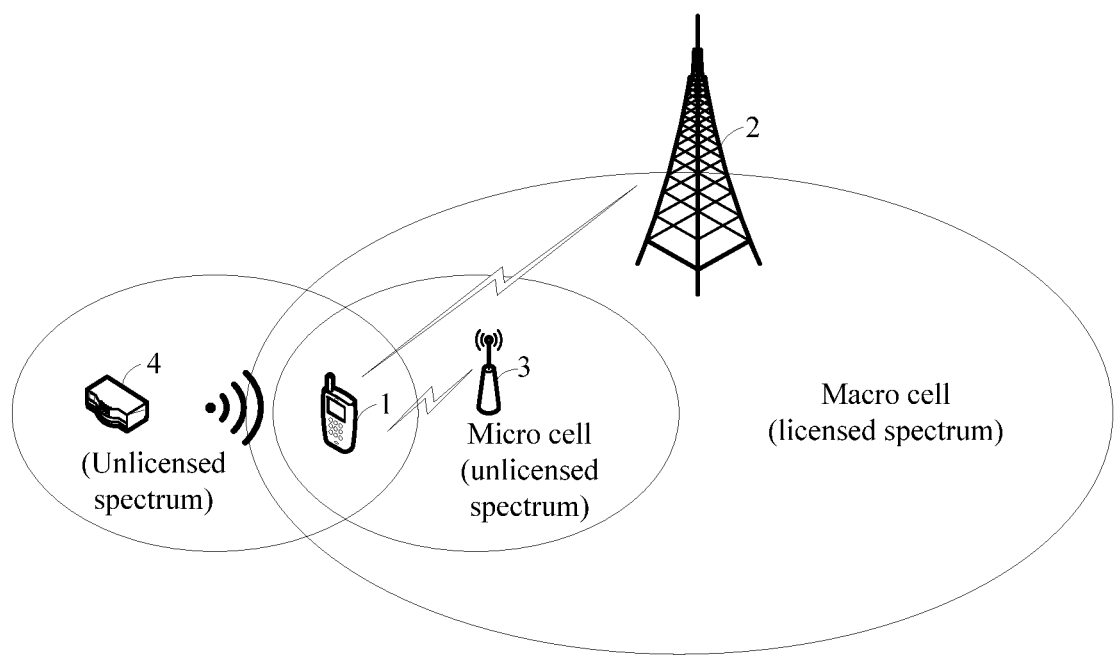
FIG. 1 is a schematic architectural diagram of a communications system according to an embodiment of this application.

The term "and/or" in this specification describes only an association relationship for describing associated objects and represents that three relationships may exist. For example, A and/or B may represent the following three cases: Only A exists, both A and B exist, and only B exists.

In the specification and claims of this application, the terms "first", "second", "third", "fourth", and so on are intended to distinguish between different objects but do not indicate a particular order of the objects. For example, a first radio access technology, a second radio access technology, and the like are intended to distinguish between different radio access technologies, but not to describe a particular order of the radio access technologies.

In addition, in the embodiments of this application, the word "example" or "for example" is used to represent giving an example, an illustration, or a description. Any embodiment or design scheme described as an "example" or "for example" in the embodiments of this application should not be explained as being more preferred or having more advantages than another embodiment or design scheme. Exactly, use of the word "example" or "for example" or the like is intended to present a relative concept in a specific manner.

In the description of the embodiment of this application, unless otherwise stated, "plurality" means at least two. For example, a plurality of processing modules mean at least two processing modules, and a plurality of network units mean at least two network units.

The following first describes some technical terms or nouns that may be mentioned in the embodiments of this application.

CA is a technology for aggregating a plurality of consecutive or nonconsecutive component carriers (component carrier, CC) to implement relatively high transmission bandwidth or a relatively high transmission rate.

An LAA technology means using an LTE technology on an unlicensed spectrum, and based on a CA architecture, using a cell corresponding to a CC on a licensed spectrum as a primary cell (primary cell, PCell), and using a cell corresponding to a CC on an unlicensed spectrum as a secondary cell (secondary cell, SCell). In addition, to ensure coexistence with another radio access technology using an unlicensed spectrum, LAA uses a listen before talk (listen before talk, LBT) manner to contend for a channel.

A PCell is a primary serving cell on which UE supporting a CA technology (CA UE for short) camps.

An SCell is a secondary serving cell on which CA UE camps.

It should be noted that all SCells mentioned in this application file are SCells of the LAA technology on an unlicensed spectrum.

A primary component carrier (primary component carrier, PCC) is a CC corresponding to a PCell.

A secondary component carrier (secondary component carrier, SCC) is a CC corresponding to an SCell.

A Wi-Fi 5G technology is a Wi-Fi technology using a radio wave band of 5 GHz. A Wi-Fi 2.4G technology is a Wi-Fi technology using a radio wave band of 2.4 GHz.

In the embodiments of this application, because the 3rd generation partnership project (3rd generation partnership project, 3GPP) stipulates that a potential band of LAA on an unlicensed spectrum is 5150-5950 MHz, mutual interference may occur between the LAA technology and the Wi-Fi 5G technology, but no mutual interference occurs between the LAA technology and the Wi-Fi 2.4G technology.

The embodiments of this application provide a method for using a radio access technology, user equipment, and a system. The UE supports a first radio access technology and a second radio access technology. Both the first radio access technology and the second radio access technology use an unlicensed spectrum. The second radio access technology is a CA technology using the unlicensed spectrum. If the UE determines to use the first radio access technology, when the UE currently uses the second radio access technology, the UE may trigger a first event so that a base station cannot configure a secondary cell of the second radio access technology on the unlicensed spectrum, or deletes the configured secondary cell, so as to disable the second radio access technology.

In the embodiments of this application, the UE may trigger the first event so that the base station cannot configure a secondary cell of the second radio access technology on the unlicensed spectrum or deletes the configured secondary cell, so as to disable the second radio access technology. However, the UE may still properly perform cellular communication in a primary cell on a licensed spectrum, that is, the UE is not disconnected from the licensed spectrum. Therefore, when the UE simultaneously supports a plurality of radio access technologies using an unlicensed spectrum, service continuity can be ensured for the UE when the UE switches from one radio access technology to another radio access technology.

The method for using a radio access technology and the user equipment that are provided in the embodiments of this application may be applied to a communications system. The communications system may be a communications system to which the LAA technology is applied (that is, the communications system is a communications system in a CA scenario). The communications system may include a macro base station, a micro base station, a wireless access point, and UE. The macro base station works on a licensed spectrum. The micro base station and the wireless access point work on an unlicensed spectrum. The macro base station and the micro base station perform carrier aggregation (that is, the LAA technology). It can be understood that after carrier aggregation, the macro base station may serve as a primary base station obtained through carrier aggregation, and the micro base station may serve as a secondary base station obtained through carrier aggregation.

For example, FIG. 1 is a schematic architectural diagram of a communications system according to an embodiment of this application. As shown in FIG. 1, the communications system may include UE 1, a macro base station 2, a micro base station 3, and a Wi-Fi access point 4 (which may be, for example, a wireless router, UE, or another device with a Wi-Fi function). The UE 1 is wirelessly connected to each of the macro base station 2, the micro base station 3, and the Wi-Fi access point 4. A serving cell of the macro base station 2 on a licensed spectrum is referred to as a macro cell. A serving cell of the micro base station on an unlicensed spectrum is referred to as a micro cell. Based on the communications system shown in FIG. 1, in an LAA technology, the macro base station 2 may serve as a primary base station, and the micro base station 3 may serve as a secondary base station. In this case, the macro cell may serve as a PCell, and the micro cell may serve as an SCell. Cellular communication may be performed between the UE 1 and the primary base station (namely, the macro base station 2) through both the PCell and the SCell. This can increase transmission bandwidth, a transmission rate, and a data throughput between the UE 1 and the primary base station. Cellular communication may be performed between the UE 1 and the secondary base station (namely, the micro base station 3) through the SCell.

A band of 5 GHz on the unlicensed spectrum is used as an example. Both the micro cell and a serving cell of the Wi-Fi access point 4 are on the unlicensed spectrum. However, on the unlicensed spectrum, the UE usually contends for a transmission resource through spontaneous preemption. Therefore, when the UE supports both a Wi-Fi 5G technology and the LAA technology, mutual interference may occur between the Wi-Fi 5G technology and the LAA technology.

In the embodiments of this application, unless otherwise stated, all base stations mentioned in the claims and the specification of this application are primary base stations, for example, may be the macro base station 2 serving as the primary base station in the communications system shown in FIG. 1.

An apparatus, provided in an embodiment of this application, for using a radio access technology may be UE (which may be, for example, the UE 1 shown in FIG. 1). The UE may be a wireless or wired terminal. The wireless terminal may be a device that provides a user with voice and/or data connectivity, a handheld device with a wireless connection function, or another processing device connected to a wireless modem. The wireless terminal may perform cellular communication with one or more core networks through a radio access network (radio access network, RAN). The wireless terminal may be a mobile terminal, for example, a mobile phone (also referred to as a mobile phone, a "cellular" phone, or the like) or a computer with a mobile terminal. For example, the wireless terminal may be a portable, pocket-sized, handheld, computer built-in, or in-vehicle mobile apparatus, which exchanges voice and/or data with the radio access network. For example, the wireless terminal may be a device such as a personal communication service (personal communication service, PCS) phone, a cordless telephone set, a session initiation protocol (session initiation protocol, SIP) phone, a wireless local loop (wireless local loop, WLL) station, or a personal digital assistant (personal digital assistant, PDA). The wireless terminal may also be referred to as a system, a subscriber unit (subscriber unit), a subscriber station (subscriber station), a mobile station (mobile station), a mobile console (mobile), a remote station (remote station), an access point (access point), a remote terminal (remote terminal), an access terminal (access terminal), a user terminal (user terminal), a user agent (user agent), or other user equipment.

Figure 2:
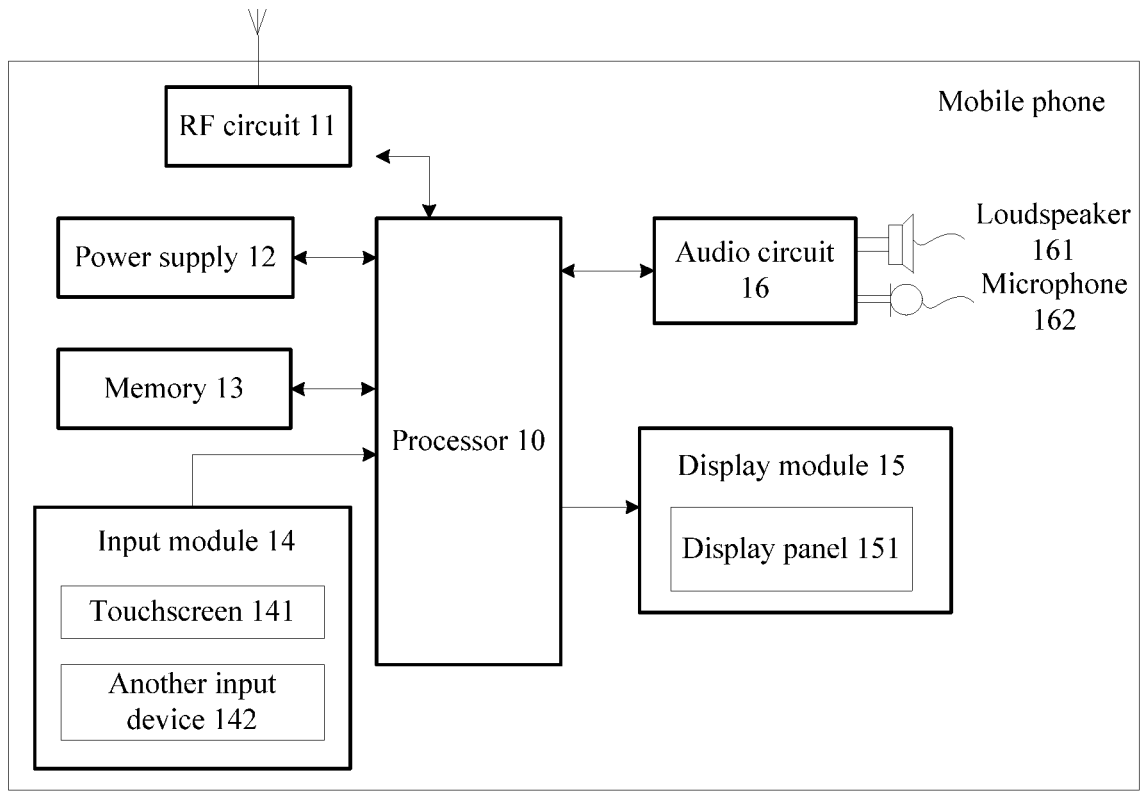
FIG. 2 is a schematic diagram of hardware of a mobile phone according to an embodiment of this application.

Further, by using an example in which the UE provided in this embodiment of this application is a mobile phone, the following specifically describes various constituent parts of the mobile phone with reference to FIG. 2.

For example, as shown in FIG. 2, the mobile phone provided in this embodiment of this application may include components such as a processor 10, an RF circuit 11, a power supply 12, a memory 13, an input module 14, a display module 15, and an audio circuit 16. A person skilled in the art can understand that the structure of the mobile phone structure shown in FIG. 2 does not constitute any limitation on the mobile phone. The mobile phone may include more or fewer components than those shown in FIG. 2, or may include a combination of some of the components shown in FIG. 2, or may have components disposed differently from those shown in FIG. 2.

The processor 10 is a control center of the mobile phone, connects various parts of the entire mobile phone by using various interfaces and lines, and executes various functions and data processing of the mobile phone by running or executing a software program and/or a module stored in the memory 13 and by invoking data stored in the memory 13, to perform overall monitoring on the mobile phone. Optionally, the processor 10 may include one or more processing modules. For example, the processor 10 may integrate an application processor (application processor, AP) and a modem processor. The application processor mainly processes an operating system, a user interface, an application, and the like. The modem processor mainly processes wireless communication and the like. It can be understood that the modem processor may be alternatively a processor independent of the processor 10.

The RF circuit 11 may be configured to send/receive a signal in a process of sending/receiving information or in a call process. For example, the RF circuit 11 receives downlink information of a base station, and sends the downlink information to the processor 10 for processing; and sends uplink data to the base station. Usually, the RF circuit includes but is not limited to an antenna, at least one amplifier, a transceiver, a coupler, a low noise amplifier (low noise amplifier, LNA), a duplexer, and the like. In addition, the mobile phone may further implement wireless communication with another device on a network through the RF circuit 11. Any communication standard or protocol may be used in the wireless communication, including but not limited to a global system for mobile communications (global system of mobile communication, GSM), a general packet radio service (general packet radio service, GPRS), code division multiple access (code division multiple access, CDMA), wideband code division multiple access (wideband code division multiple access, WCDMA), long term evolution (long term evolution, LTE), an email, a short message service (short messaging service, SMS), and the like.

The power supply 12 may be configured to supply power to various parts of the mobile phone. The power supply 12 may be a battery. Optionally, the power supply may be logically connected to the processor 10 through a power management system, so as to use the power management system to implement functions such as charging management, discharging management, and power consumption management.

The memory 13 may be configured to store the software program and/or the module. The processor 10 runs the software program and/or the module stored in the memory 13, to perform various function applications and data processing of the mobile phone. The memory 13 may mainly include a program storage area and a data storage area. The program storage area may store an operating system, an application required by at least one function (for example, a sound playback function or an image playback function), and the like. The data storage area may store data (such as audio data, image data, and a phone book) created based on usage of the mobile phone, and the like. In addition, the memory 13 may include a high-speed random access memory, or may include a nonvolatile memory, for example, at least one magnetic disk storage device or a flash memory device, or may include another volatile solid-state storage device.

The input module 14 may be configured to receive input digital or character information, and generate a key signal input related to user settings and function control of the mobile phone. Specifically, the input module 14 may include a touchscreen 141 and another input device 142. The touchscreen 141 is also referred to as a touch panel, and may collect a touch operation performed by a user on or near the touchscreen 141 (for example, an operation performed on the touchscreen 141 or near the touchscreen 141 by the user by using any appropriate object or accessory such as a finger or a stylus), and drive a corresponding connected apparatus according to a preset program. Optionally, the touchscreen 141 may include two parts: a touch detection apparatus and a touch controller.

The touch detection apparatus detects a touch orientation of the user, detects a signal generated by the touch operation, and transmits the signal to the touch controller. The touch controller receives touch information from the touch detection apparatus, converts the touch information into contact coordinates, sends the contact coordinates to the processor 10, and can receive and execute a command sent by the processor 10. In addition, the touchscreen 141 may be implemented in a plurality of types, for example, a resistive type, a capacitive type, an infrared type, and a surface acoustic wave type. The another input device 142 may include but is not limited to one or more of a physical keyboard, a function key (for example, a volume control key or a power on/off key), a track ball, a mouse, and a joystick.

The display module 15 may be configured to display information entered by a user or information provided for a user, and various menus of the mobile phone. The display module 15 may include a display panel 151. Optionally, the display panel 151 may be configured in a form of a liquid crystal display (liquid crystal display, LCD), an organic light-emitting diode (organic light-emitting diode, OLED), or the like. Further, the touchscreen 141 may cover the display panel 151. After detecting a touch operation on or near the touchscreen 141, the touchscreen 141 transmits the touch operation to the processor 10 to determine a type of a touch event. Then the processor 10 provides a corresponding visual output on the display panel 151 based on the type of the touch event.

In FIG. 2, the touchscreen 141 and the display panel 151 are used as two independent parts to implement input and output functions of the mobile phone. However, in some embodiments, the touchscreen 141 and the display panel 151 may be integrated to implement the input and output functions of the mobile phone.

The audio circuit 16, a loudspeaker 161, and a microphone 162 are configured to provide an audio interface between the user and the mobile phone. In one aspect, the audio circuit 16 may transmit, to the loudspeaker 161, an electrical signal that is converted from received audio data. The loudspeaker 161 converts the electrical signal into an acoustical signal and outputs the acoustical signal. In another aspect, the microphone 162 converts a collected acoustical signal into an electrical signal. The audio circuit 16 receives the electrical signal, converts the electrical signal into audio data, and then outputs the audio data to the RF circuit 11 through the processor 10, so as to send the audio data to, for example, another mobile phone, or outputs the audio data to the memory 13 through the processor 10 for further processing.

Optionally, the mobile phone shown in FIG. 2 may further include various sensors, for example, a gyroscope sensor, a hygrometer sensor, an infrared sensor, and a magnetometer sensor. Details are not described herein.

Optionally, the mobile phone shown in FIG. 2 may further include a Wi-Fi module (for example, a Wi-Fi chip), a Bluetooth module (for example, a Bluetooth chip), and the like. Details are not described herein.

Optionally, a first radio access technology and a second radio access technology provided in the embodiments of this application may be radio access technologies using any band on an unlicensed spectrum, for example, may be radio access technologies using a band of 5 GHz on the unlicensed spectrum, or may be radio access technologies using a band of 60 GHz on the unlicensed spectrum. Specifically, this may be determined based on an actual use scenario. This is not limited in the embodiments of this application.

Optionally, in the embodiments of this application, the radio access technologies using the band of 5 GHz on the unlicensed spectrum are used as an example. The first radio access technology may be a Wi-Fi 5G technology, and the second radio access technology may be an LAA technology or an LTE-unlicensed (LTE-Unlicensed, LTE-U) technology. That is, both the Wi-Fi 5G technology and the LAA technology use the unlicensed spectrum, and LAA is a CA technology using the unlicensed spectrum.

The following describes an example of a method, provided in an embodiment of this application, for using a radio access technology, by using an example in which a first radio access technology provided in this embodiment of this application is a Wi-Fi 5G technology, a second radio access technology is an LAA technology, and UE supports the Wi-Fi 5G technology and the LAA technology.

Figure 3:
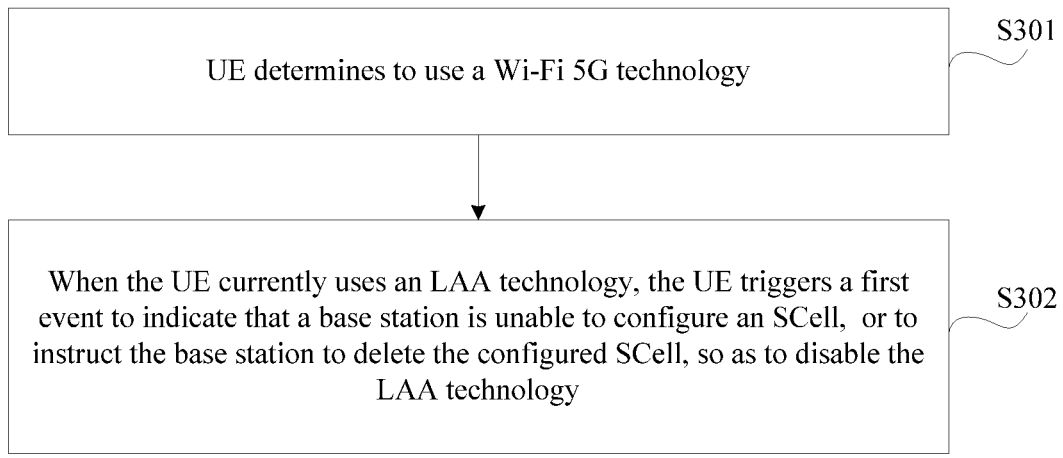
FIG. 3 is a schematic diagram 1 of a method for using a radio access technology according to an embodiment of this application.

As shown in FIG. 3, an embodiment of this application provides a method for using a radio access technology. The method may include the following steps S301 to S302.

S301. UE determines to use a Wi-Fi 5G technology.

In this embodiment of this application, the UE may support a plurality of radio access technologies. When the UE supports both the Wi-Fi 5G technology and the LAA technology in the foregoing example, both the Wi-Fi 5G technology and the LAA technology use an unlicensed spectrum. However, on the unlicensed spectrum, the UE usually contends for a transmission resource through spontaneous preemption. Therefore, when the UE determines to transmit a service by using the Wi-Fi 5G technology, to preferentially ensure that the UE transmits the service by using the Wi-Fi 5G technology, the UE may disable the LAA technology, so that the UE transmits the service on the unlicensed spectrum by using the Wi-Fi 5G technology. When the UE determines to no longer transmit a service by using the Wi-Fi 5G technology, to ensure that the UE can properly transmit a service by using the LAA technology, the UE may re-enable the LAA technology, so that the UE transmits a service on the unlicensed spectrum by using the LAA technology.

Optionally, in this embodiment of this application, scenarios in which the UE determines to use the Wi-Fi 5G technology may include one of the following:

(1) The UE enables a mobile hotspot for the Wi-Fi 5G technology.

In this embodiment of this application, after the UE enables the mobile hotspot for the Wi-Fi 5G technology, it indicates that the UE may need to transmit a service by using the Wi-Fi 5G technology. In this case, the UE may determine to use the Wi-Fi 5G technology. It can be understood that after the UE enables the mobile hotspot for the Wi-Fi 5G technology, another device with a Wi-Fi function (referred to as another device, for example, other UE) may be connected to the UE, and transmit a service through the UE. In this case, the service transmitted by the UE by using the Wi-Fi 5G technology is the service transmitted by the another device through the UE.

(2) The UE establishes a peer-to-peer (peer to peer, P2P) network connection by using the Wi-Fi 5G technology.

The P2P network connection may also be referred to as a Wi-Fi direct connection. To be specific, two devices between which a Wi-Fi direct connection is established may transmit a service by using a Wi-Fi technology.

In this embodiment of this application, after the UE establishes the P2P network connection by using the Wi-Fi 5G technology, it indicates that the UE may need to transmit a service by using the Wi-Fi 5G technology. In this case, the UE may determine to use the Wi-Fi 5G technology. It can be understood that after the UE establishes the P2P network connection to the another device by using the Wi-Fi 5G technology, a service may be transmitted between the UE and the another device by using the Wi-Fi 5G technology.

(3) The UE is connected to an access point that uses the Wi-Fi 5G technology.

The access point may be a wireless router, UE, or another device with a Wi-Fi function.

In this embodiment of this application, after the UE is connected to the access point that uses the Wi-Fi 5G technology, it indicates that the UE may need to transmit a service by using the Wi-Fi 5G technology. In this case, the UE may determine to use the Wi-Fi 5G technology. It can be understood that after the UE is connected to the access point that uses the Wi-Fi 5G technology, the UE may transmit a service through the access point by using the Wi-Fi 5G technology.

Optionally, in this embodiment of this application, step S301 may be specifically implemented by the following step S301*a* or S301*b*.

S301*a*. The UE determines, according to a current service requirement of the UE, to use the Wi-Fi 5G technology.

In this embodiment of this application, when the UE determines that a service needs to be transmitted through Wi-Fi, for example, the UE needs to access a network by using a Wi-Fi technology, the UE may determine to use the Wi-Fi 5G technology. In other words, the UE may determine, according to the current service requirement of the UE, that the UE is to use the Wi-Fi 5G technology.

S301*b*. The UE determines, based on a selection operation of a user, to use the Wi-Fi 5G technology.

In this embodiment of this application, the UE may determine, based on the selection operation of the user, to use the Wi-Fi 5G technology.

With reference to the two scenarios shown in (1) and (3) and using the following (1a) and (1b) as examples, the following describes an example of determining, by the UE based on the selection operation of the user, to use the Wi-Fi 5G technology.

(1a) For the scenario shown in (1), when the user sets the UE as a mobile hotspot for a Wi-Fi technology, because no mutual interference occurs between a Wi-Fi 2.4G technology and the LAA technology, the user may be prompted to set the UE as a mobile hotspot for the Wi-Fi 2.4G technology in this embodiment of this application. This can prevent the UE from enabling a mobile hotspot for the Wi-Fi 5G technology, thereby ensuring that no mutual interference occurs when the UE transmits services by using the Wi-Fi technology and the LAA technology.

Figure 4:
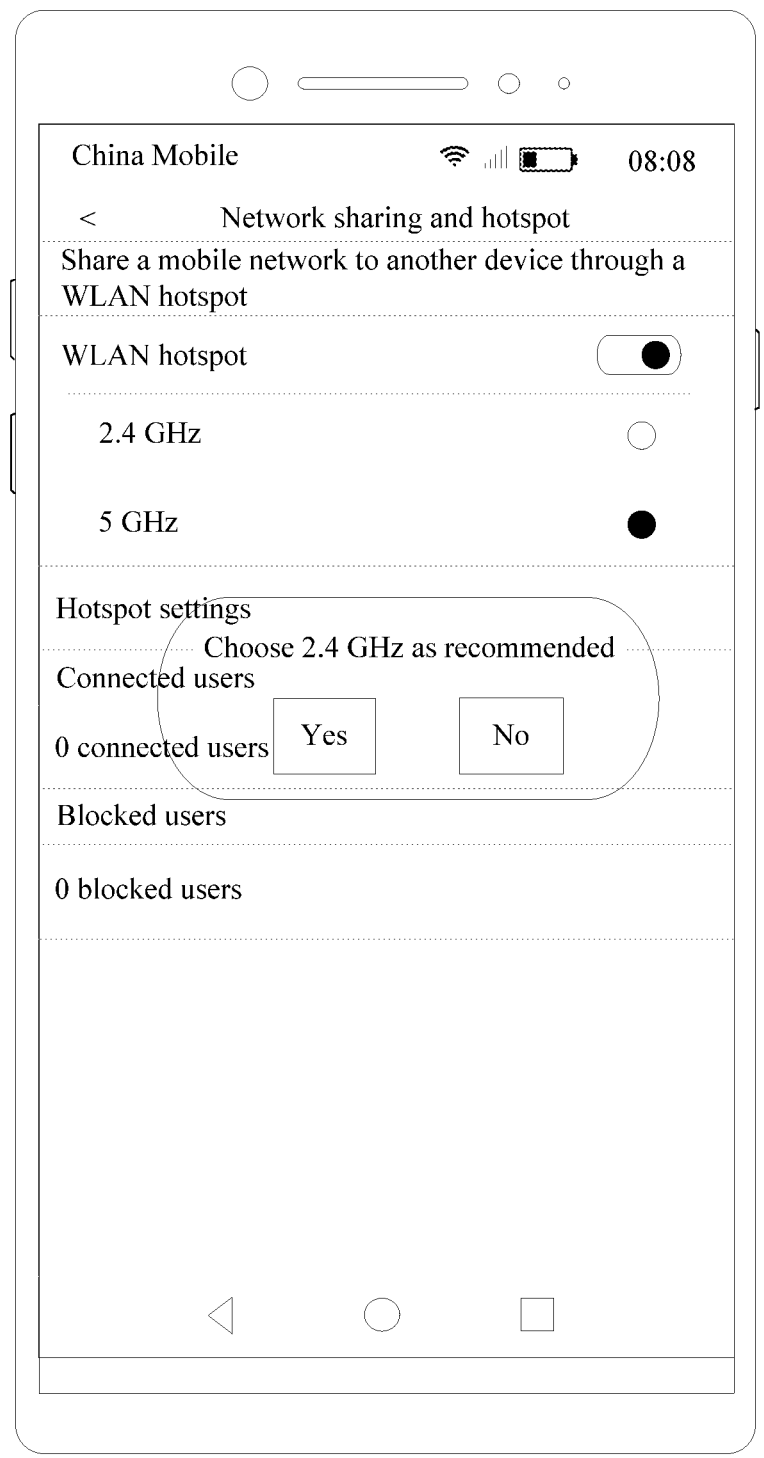
FIG. 4 is a schematic diagram 1 of an interface for setting an access point according to an embodiment of this application.

For example, in this embodiment of this application, that the UE is a mobile phone with an Android (Android) operating system is used as an example. As shown in FIG. 4, two options of 2.4 GHz and 5 GHz may be added under "Wireless local area network (wireless local area networks, WLAN) hotspot" in "Settings—Network sharing and hotspot" of the mobile phone, for the user to choose from. In this way, as shown in FIG. 4, the user may set a WLAN hotspot in "Settings—Network sharing and hotspot". For example, the user may enable "WLAN hotspot". After the user enables "WLAN hotspot", the UE displays the option of "2.4 GHz" and the option of "5 GHz". If the user chooses the option of "5 GHz", the UE may display a prompt "Choose 2.4 GHz as recommended" to the user. That is, the UE prompts the user to set the UE as a mobile hotspot for the Wi-Fi 2.4G technology. It can be understood that after the user chooses the option of "2.4 GHz", the mobile phone is used as an access point for the Wi-Fi 2.4G technology for another device to access; or after the user chooses the option of "5 GHz", the mobile phone is used as an access point for the Wi-Fi 5G technology for another device to access.

Certainly, in this case, if the user ignores the prompt of the UE and still chooses the Wi-Fi 5G technology, after the user sets the UE as a mobile hotspot for the Wi-Fi 5G technology, that is, the UE enables a mobile hotspot for the Wi-Fi 5G technology, the UE may perform the method for using a radio access technology provided in this embodiment of this application. For example, the UE may perform the method shown in FIG. 3 in this embodiment of this application to disable the LAA technology, so as to preferentially ensure that the UE transmits a service by using the Wi-Fi 5G technology.

(1b) For the scenario shown in (3), when the user is connected to an access point that uses the Wi-Fi 5G technology, because no mutual interference occurs between a Wi-Fi 2.4G technology and the LAA technology, the user may be prompted to choose an access point that uses the Wi-Fi 2.4G technology for connection in this embodiment of this application. This can prevent the UE from connecting to the access point that uses the Wi-Fi 5G technology, thereby ensuring that no mutual interference occurs when the UE transmits services by using a Wi-Fi technology and the LAA technology.

Figure 5:
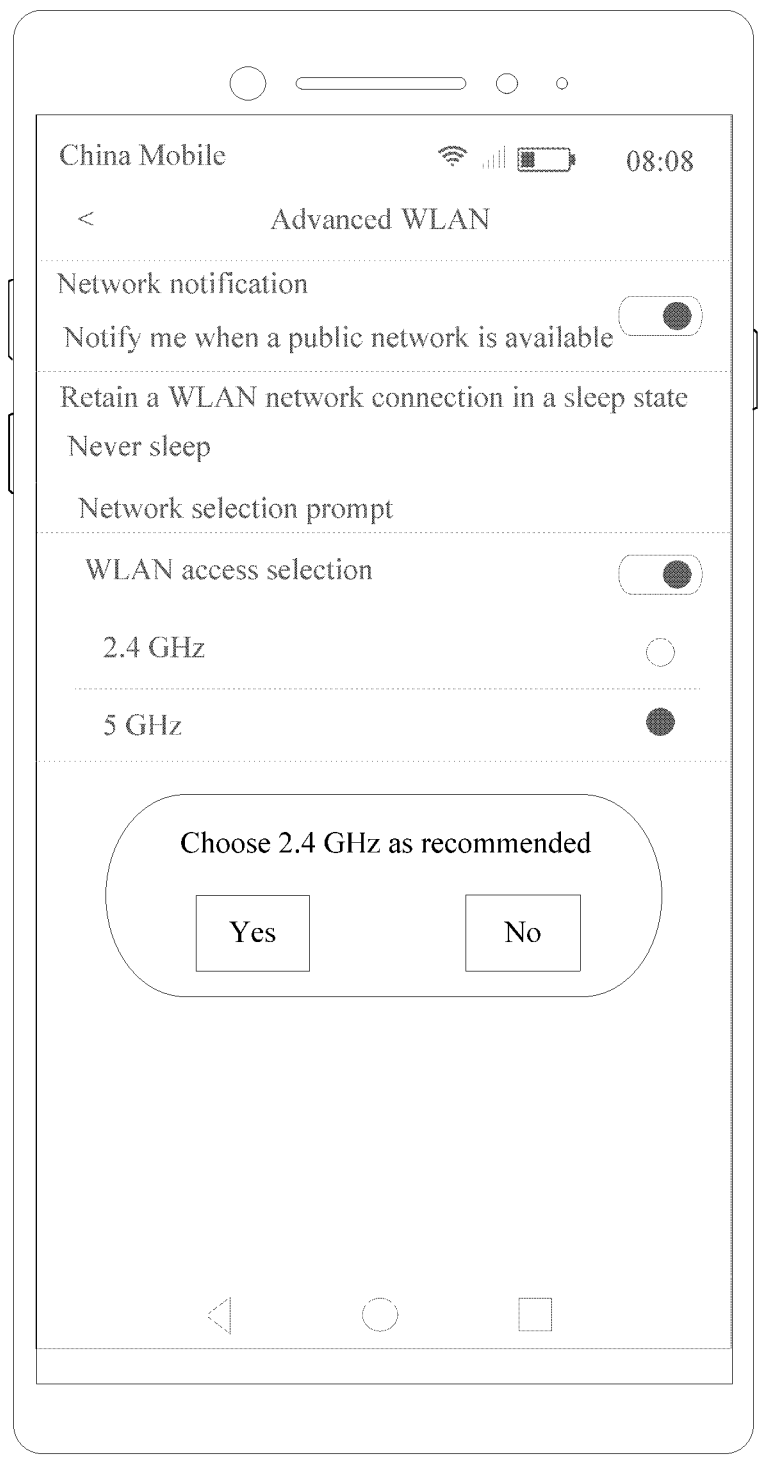
FIG. 5 is a schematic diagram 2 of an interface for setting an access point according to an embodiment of this application.

For example, in this embodiment of this application, that the UE is a mobile phone with an Android operating system is still used as an example. As shown in FIG. 5, an option of "WLAN access selection" may be added in "Settings—WLAN—More—Advanced" of the mobile phone, and two options of 2.4 GHz and 5 GHz may be added under the option, for the user to choose from. In this way, as shown in FIG. 5, the user may set a WLAN access manner for the mobile phone in "Settings—WLAN—More—Advanced". For example, the user may enable "WLAN access selection" on a setup interface of "Advanced WLAN". After the user enables "WLAN access selection", the mobile phone displays the option of "2.4 GHz" and the option of "5 GHz". If the user chooses the option of "5 GHz", the mobile phone may display a prompt "Choose 2.4 GHz as recommended" to the user. That is, the mobile phone prompts the user to choose the access point that uses the Wi-Fi 2.4G technology for connection. It can be understood that after the user chooses the option of "2.4 GHz", the mobile phone may display only the access point that uses the Wi-Fi 2.4G technology in "Settings—WLAN—Available WLANs"; or after the user chooses the option of "5 GHz", the mobile phone may display only the access point that uses the Wi-Fi 5G technology in "Settings—WLAN—Available WLANs".

Certainly, in this case, if the user ignores the prompt of the UE and still chooses the Wi-Fi 5G technology, after the user chooses the access point that uses the Wi-Fi 5G technology for connection, that is, the UE is connected to the access point that uses the Wi-Fi 5G technology, the UE may perform the method for using a radio access technology provided in this embodiment of this application. For example, the UE may perform the method shown in FIG. 3 in this embodiment of this application to disable the LAA technology, so as to preferentially ensure that the UE transmits a service by using the Wi-Fi 5G technology.

Optionally, in this embodiment of this application, for the scenario shown in (2), an example of determining to use the Wi-Fi 5G technology by the UE may be described by using the following (1c) as an example.

(1c) For the scenario shown in (2), when the UE establishes a P2P network connection by using the Wi-Fi 5G technology, the UE first performs P2P negotiation with a device to which the UE is to establish a P2P connection (referred to as a connection device). In this embodiment of this application, in a P2P negotiation process, because no mutual interference occurs between a Wi-Fi 2.4G technology and the LAA technology, the UE may temporarily disable the Wi-Fi 5G technology and use the Wi-Fi 2.4G technology for P2P negotiation. In this way, after the P2P negotiation is completed, the UE may establish a P2P network connection to the connection device by using the Wi-Fi 2.4G technology, thereby ensuring that no mutual interference occurs when the UE transmits services by using a Wi-Fi technology and the LAA technology.

S302. When the UE currently uses the LAA technology, the UE triggers a first event to indicate that a base station is unable to configure an SCell, or to instruct the base station to delete the configured SCell, so as to disable the LAA technology.

The SCell is an SCell, of the UE, that uses the LAA technology. It can be understood that the SCell is an SCell of LAA on the unlicensed spectrum.

In this embodiment of this application, the UE may trigger the first event to indicate that the base station is unable to configure an SCell, or to instruct the base station to delete the configured SCell, so as to achieve an effect of disabling the LAA technology.

In this embodiment of this application, the disabling the LAA technology may be understood as temporarily stopping the UE from using the LAA technology during a period in which the LAA technology is disabled.

After the UE determines to use the Wi-Fi 5G technology, the UE may read a flag bit on the UE, to determine whether the UE currently uses the LAA technology; and when the UE currently uses the LAA technology, disable the LAA technology. For example, the flag bit on the UE may be implemented by a register, for example, a flag register, also referred to as a program status register (Program Status Word, PSW). Specifically, the foregoing step S302 may include steps S401 to S402.

S401. The UE reads the flag bit on the UE.

The flag bit read by the UE may be a first value or a second value. That the flag bit is the first value is used to indicate that the UE currently uses the LAA technology, that is, the LAA technology is enabled. That the flag bit is the second value is used to indicate that the UE currently does not use the LAA technology, that is, the LAA technology is disabled.

After step S401, if the UE reads the flag bit being the first value, the UE may trigger the first event, to disable the LAA technology; or if the UE reads the flag bit being the second value, the UE may directly use the Wi-Fi 5G technology, without a need of triggering the first event.

S402. When the flag bit is the first value, the UE triggers the first event to indicate that the base station is unable to configure an SCell, or to instruct the base station to delete the configured SCell, so as to disable the LAA technology.

Further, after the UE disables the LAA technology, the UE may use the Wi-Fi 5G technology and set the flag bit to the second value, to indicate that the UE currently does not use the LAA technology, that is, the LAA technology is disabled. Specifically, after step S402, the method in this embodiment of this application may further include steps S501 to S502.

S501. The UE determines to use the Wi-Fi 5G technology.

S502. The UE sets the flag bit from the first value to the second value, where that the flag bit is the second value is used to indicate that the UE currently uses the Wi-Fi 5G technology.

Regarding hardware implementation, all logical function code that is related to the Wi-Fi 5G technology and that is used for implementing the method for using a radio access technology provided in this embodiment of this application is set on an AP of the UE, that is, the AP obtains and processes a status and an operation that are related to the Wi-Fi 5G technology. Therefore, when the AP of the UE determines to use the Wi-Fi 5G technology, the AP may read the flag bit on the UE. When the flag bit instructs to disable the LAA technology (that is, the flag bit is the first value), the AP may send a command to a baseband processor (which may be, for example, the modem processor in the mobile phone shown in FIG. 2), and the baseband processor performs an action of disabling the LAA technology. After the baseband processor performs the action of disabling the LAA technology, the flag bit may be set to the second value, to indicate that the LAA technology is disabled.

Optionally, in this embodiment of this application, the AP and the baseband processor may communicate with each other by using a radio interface layer (radio layer interface, RIL) interface.

Optionally, in this embodiment of this application, there may be one or more (for example, two) flag bits. In this embodiment of this application, the flag bit may be set to different values to indicate that the LAA technology is enabled or disabled. When there is one flag bit, for example, the first value may be 1, used to indicate that the UE currently uses the LAA technology, that is, LAA is enabled; and the second value may be 0, used to indicate that the UE currently uses the Wi-Fi 5G technology, that is, LAA is disabled. When there are two flag bits, for example, the first value may be 10, used to indicate that the UE currently uses the LAA technology, that is, LAA is enabled; and the second value may be 00, used to indicate that the UE currently uses the Wi-Fi 5G technology, that is, LAA is disabled.

Alternatively, the flag bit may be set to a value to indicate that the LAA technology is disabled, and the value that is set for the flag bit is cleared (that is, the flag bit is made empty) to indicate that the LAA technology is enabled. The flag bit may be set according to an actual use requirement. This is not limited in this embodiment of this application.

In the method for using a radio access technology provided in this embodiment of this application, when the UE determines to use the Wi-Fi 5G technology, if the UE currently uses the LAA technology, the UE may trigger the first event so that the base station cannot configure a secondary cell of the LAA technology on the unlicensed spectrum or deletes the configured secondary cell, so as to disable the LAA technology supported by the UE. In this embodiment of this application, the UE may trigger the first event so that the base station cannot configure a secondary cell of the LAA technology on the unlicensed spectrum or deletes the configured secondary cell, so as to disable the LAA technology supported by the UE. Therefore, the UE may still properly perform cellular communication in a primary cell on a licensed spectrum, that is, the UE is not disconnected from the licensed spectrum. In this way, when the UE supports both the Wi-Fi 5G technology and the LAA technology, service continuity can be ensured for the UE when the UE switches from the LAA technology to the Wi-Fi 5G technology.

Further, in this embodiment of this application, when the UE supports both the Wi-Fi 5G technology and the LAA technology, the UE may still properly perform cellular communication in the primary cell on the licensed spectrum when switching from the LAA technology to the Wi-Fi 5G technology. Therefore, the UE may transmit services by using both the Wi-Fi 5G technology and an LTE technology. This can avoid mutual interference between the Wi-Fi 5G technology and the LAA technology.

It can be understood that in this embodiment of this application, after the LAA technology is disabled, the UE cannot perform cellular communication by using the unlicensed spectrum, but may still perform cellular communication by using the licensed spectrum. Therefore, after the LAA technology is disabled, it can be understood that the UE performs communication by using the LTE technology.

A status of using the LAA technology by the UE may be that the secondary cell has been configured but not activated, that the secondary cell has been configured and activated, or that the secondary cell is not configured.

Optionally, in this embodiment of this application, when statuses of using the LAA technology by the UE are different, first events triggered by the UE may be different, and processes of triggering the first events by the UE may also be different. Therefore, before triggering the first event, the UE may first determine the status of using the LAA technology by the UE, and then the UE triggers the first event based on the status.

Figure 6A:
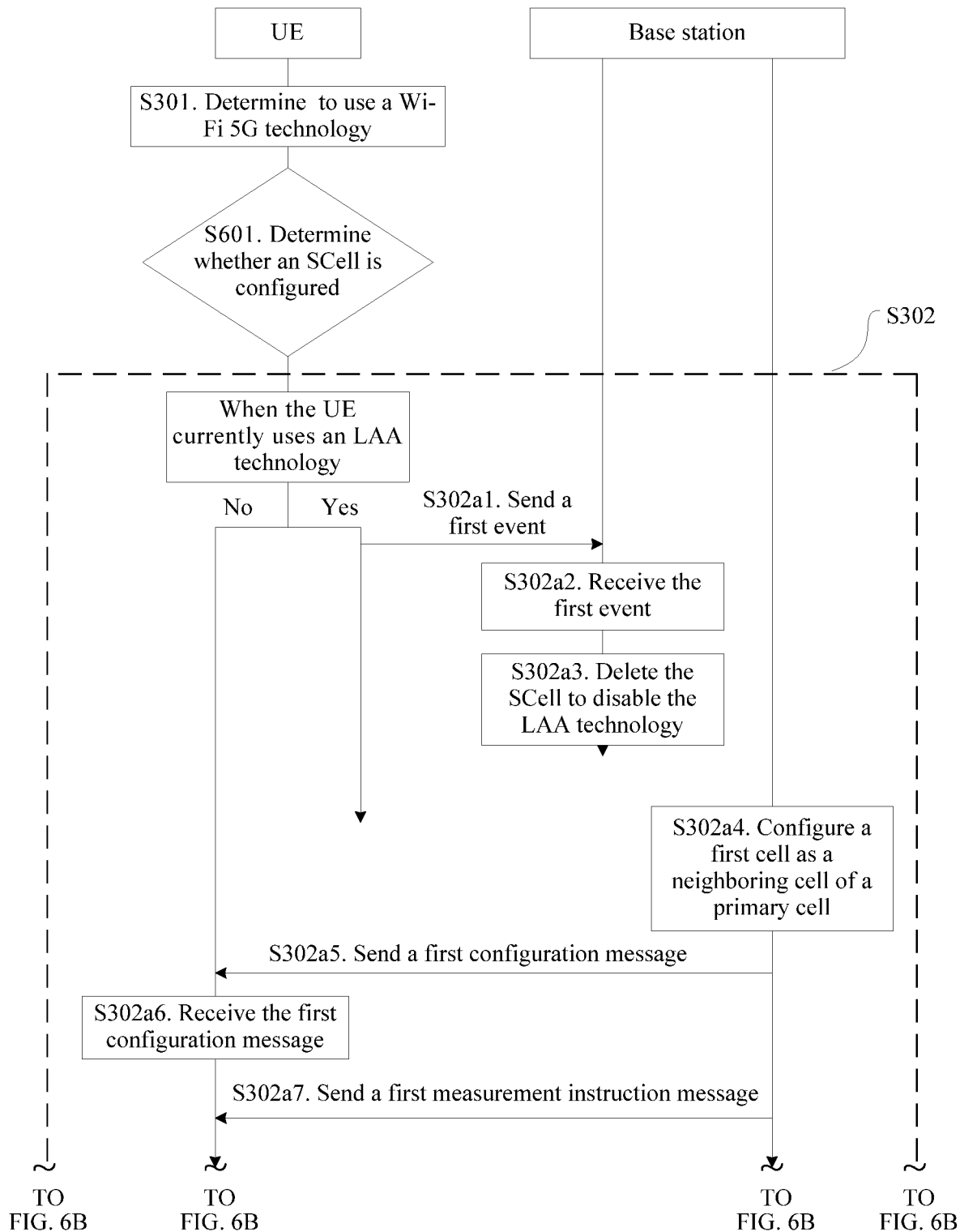
FIG. 6A and FIG. 6B are a schematic diagram 2 of a method for using a radio access technology according to an embodiment of this application.
Figure 6B:
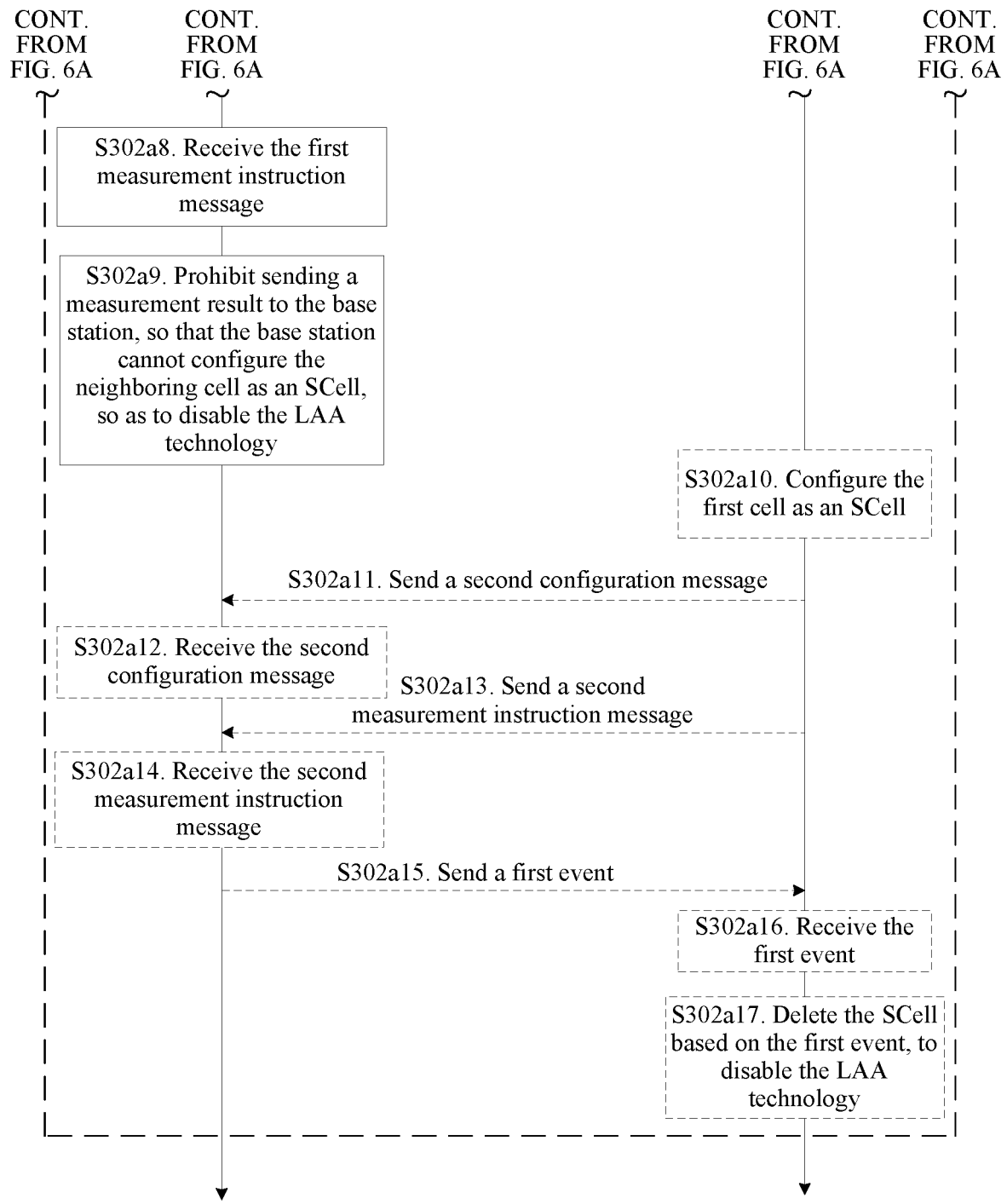

For example, with reference to FIG. 3, as shown in FIG. 6A and FIG. 6B, after step S301, before step S302 or S402 that "the UE triggers a first event to indicate that a base station is unable to configure an SCell, or to instruct the base station to delete the configured SCell, so as to disable the LAA technology", the method for using a radio access technology provided in this embodiment of this application may further include the following step S601.

S601. The UE determines whether the status of using the LAA technology by the UE is that the SCell has been configured.

The status of using the LAA technology by the UE (for example, the SCell has been configured but not activated, the SCell has been configured and activated, or the SCell is not configured) is obtained by the baseband processor from the base station and sent to the AP. After determining to use the Wi-Fi 5G technology, the AP may determine, based on the status of using the LAA technology by the UE that is sent by the baseband processor, whether the status of using the LAA technology by the UE is that the SCell has been configured.

Optionally, in this embodiment of this application, the status of using the LAA technology by the UE may be that the SCell has been configured but not activated, the SCell has been configured and activated, or the SCell is not configured.

In one aspect, when the UE determines that the status of using the LAA technology by the UE is that the SCell has been configured, regardless of whether the configured SCell is activated, that is, regardless of whether the UE determines that the status of using the LAA technology by the UE is that the SCell has been configured but not activated or the SCell has been configured and activated, steps S302 and S402 that "the UE triggers a first event to indicate that a base station is unable to configure an SCell, or to instruct the base station to delete the configured SCell, so as to disable the LAA technology" may be specifically implemented by a process shown in steps S302a1 to S302a3 in the following first optional implementation. For example, as shown in FIG. 6A and FIG. 6B, step S302 that "the UE triggers a first event to indicate that a base station is unable to configure an SCell, or to instruct the base station to delete the configured SCell, so as to disable the LAA technology" shown in FIG. 3 may be specifically implemented by a process shown in steps S302a1 to S302a3 in the following first optional implementation.

In another aspect, when the UE determines that the status of using the LAA technology by the UE is that the SCell is not configured, the UE may wait for the base station to configure an SCell. In a process of configuring an SCell by the base station, the base station may configure the SCell through non-blind configuration or blind configuration.

For example, if the base station configures the SCell through non-blind configuration, steps S302 and S402 that "the UE triggers a first event to indicate that a base station is unable to configure an SCell, or to instruct the base station to delete the configured SCell, so as to disable the LAA technology" may be specifically implemented by a process shown in steps S302a4 to S302a9 in the following second optional implementation. For example, as shown in FIG. 6A and FIG. 6B, step S302 that "the UE triggers a first event to indicate that a base station is unable to configure an SCell, or to instruct the base station to delete the configured SCell, so as to disable the LAA technology" shown in FIG. 3 may be specifically implemented by a process shown in steps S302a4 to S302a9 in the following second optional implementation.

If the base station configures the SCell through blind configuration, steps S302 and S402 that "the UE triggers a first event to indicate that a base station is unable to configure an SCell, or to instruct the base station to delete the configured SCell, so as to disable the LAA technology" may be specifically implemented by a process shown in steps S302a10 to S302a17 in the following third optional implementation. For example, as shown in FIG. 6A and FIG. 6B, step S302 that "the UE triggers a first event to indicate that a base station is unable to configure an SCell, or to instruct the base station to delete the configured SCell, so as to disable the LAA technology" shown in FIG. 3 may be specifically implemented by a process shown in steps S302a10 to S302a17 in the following third optional implementation. Specifically, a specific implementation may be selected based on the status, determined by the UE, of using the LAA technology by the UE. This is not limited in this embodiment of this application.

It should be noted that in this embodiment of this application, when the status of using the LAA technology by the UE is that the SCell has been configured but not activated or the SCell has been configured and activated, the UE may determine, according to (1a), (1b), and (1c), to use the Wi-Fi 5G technology. When the status of using the LAA technology by the UE is that the SCell is not configured, the UE may perform at least one of the three scenarios (1), (2), and (3) by directly using the Wi-Fi 5G technology according to a default procedure.

For the three statuses listed in step S601, the following describes examples of a process of triggering the first event by the UE in the following three optional implementations.

In the first optional implementation, the status of using the LAA technology by the UE is that the SCell has been configured but not activated or the SCell has been configured and activated. The first event is used to indicate that signal quality of the SCell is lower than a first threshold.

It can be understood that in an LTE system, the first event in this implementation may be an A2 event.

For example, as shown in FIG. 6A and FIG. 6B, in the method for using a radio access technology provided in this embodiment of this application, when the status of using the LAA technology by the UE is that the SCell has been configured but not activated or the SCell has been configured and activated, step S302 that "the UE triggers a first event to indicate that a base station is unable to configure an SCell, or to instruct the base station to delete the configured SCell, so as to disable the LAA technology" shown in FIG. 3 may be specifically implemented by a process shown in the following steps S302a1 to S302a3.

S302a1. The UE sends the first event to the base station.

The first event is used to indicate that signal quality of the SCell is lower than the first threshold.

It can be understood that when the UE determines to use the Wi-Fi 5G technology (that is, step S301 is performed) and the status of using the LAA technology by the UE is that the SCell has been configured but not activated or the SCell has been configured and activated, the UE may perform step S401 (read the flag bit on the UE). When the flag bit is the first value, the UE may determine that the UE currently uses the LAA technology, and then may perform steps S302a1 to S302a3 to disable the LAA technology.

S302a2. The base station receives the first event sent by the UE.

S302a3. The base station deletes the SCell based on the first event, to disable the LAA technology.

In this implementation, the UE may actively send the first event to the base station, to indicate that the signal quality of the configured SCell is lower than the first threshold, that is, the SCell is no longer suitable for acting as a serving cell due to deterioration of the signal quality. After the base station receives the first event sent by the UE, the base station may determine, based on the first event, that the serving cell needs to be switched. In this case, the base station deletes the SCell.

In this implementation, the base station may delete the SCell to achieve an effect of disabling the LAA technology.

The first threshold may be set according to an actual use requirement. This is not limited in this embodiment of this application.

Optionally, the signal quality of the configured SCell may be obtained by measuring reference signal received power (reference signal receiving power, RSRP) of the configured SCell or reference signal received quality (reference signal receiving quality, RSRQ) of the configured SCell. This may be specifically selected according to an actual measurement requirement. This is not limited in this embodiment of this application.

In the second optional implementation, the status of using the LAA technology by the UE is that the SCell is not configured. The first event is used to indicate that the UE prohibits sending a result of measuring a first cell by the UE to the base station. The first cell is a serving cell of the LAA technology. It can be understood that the first cell is a serving cell of the LAA technology on the unlicensed spectrum.

For example, as shown in FIG. 6A and FIG. 6B, in the method for using a radio access technology provided in this embodiment of this application, when the status of using the LAA technology by the UE is that the SCell is not configured, step S302 that "the UE triggers a first event to indicate that a base station is unable to configure an SCell, or to instruct the base station to delete the configured SCell, so as to disable the LAA technology" shown in FIG. 3 may be specifically implemented by a process shown in the following steps S302a4 to S302a9.

S302a4. The base station configures the first cell as a neighboring cell of the primary cell.

The primary cell is a primary serving cell, among serving cells of the LAA technology, on which the UE currently camps. The first cell is different from the primary cell. It can be understood that the primary cell is a serving cell of the LAA technology on the licensed spectrum.

S302a5. The base station sends a first configuration message to the UE.

The first configuration message is used to indicate that the first cell has been configured as the neighboring cell of the primary cell.

S302a6. The UE receives the first configuration message sent by the base station.

After the UE receives the first configuration message sent by the base station, the UE may determine that the base station has configured the first cell as the neighboring cell of the primary cell.

S302a7. The base station sends a first measurement instruction message to the UE.

The first measurement instruction message is used to instruct the UE to measure signal quality of the neighboring cell. The neighboring cell is the first cell configured by the base station in step S302a4.

S302a8. The UE receives the first measurement instruction message sent by the base station.

S302a9. The UE prohibits sending a result of measuring the signal quality of the neighboring cell by the UE to the base station, so that the base station cannot configure the neighboring cell as an SCell, so as to disable the LAA technology.

It can be understood that in an LTE system, if the status of using the LAA technology by the UE is that the SCell is not configured, the UE may wait for the base station to configure an SCell. In a process of configuring an SCell by the base station, the base station first configures the first cell as the neighboring cell of the primary cell, and then instructs the UE to measure the neighboring cell. When the signal quality of the neighboring cell is higher than a second threshold, the UE sends the result of measuring the signal quality of the neighboring cell by the UE to the base station. In this embodiment of this application, that the signal quality of the neighboring cell is higher than the second threshold is denoted as an A4 event in the LTE system. Therefore, in this implementation, regardless of whether the UE measures the neighboring cell, or regardless of whether the signal quality of the neighboring cell that is obtained by the UE through measurement satisfies a sending condition of the A4 event, the first event may be triggered to prohibit the UE from sending the A4 event to the base station, so that the base station cannot learn the signal quality of the neighboring cell, and therefore the base station cannot use the neighboring cell as a serving cell, that is, the base station is unable to configure the neighboring cell as an SCell.

It can be understood that when the UE determines to use the Wi-Fi 5G technology (that is, step S301 is performed) and the status of using the LAA technology by the UE is that the SCell is not configured, the UE may perform step S401 (read the flag bit on the UE). When the flag bit is the first value, the UE may determine that the UE currently uses the LAA technology. In this case, if the UE receives the first measurement instruction message sent by the base station (that is, step S302a8 is performed), the UE may prohibit sending the result of measuring the signal quality of the neighboring cell by the UE to the base station, to disable the LAA technology.

Optionally, the UE may alternatively perform step S401 after receiving the first measurement instruction message sent by the base station (that is, step S302a8 is performed). Specifically, when the UE determines to use the Wi-Fi 5G technology (that is, step S301 is performed) and the status of using the LAA technology by the UE is that the SCell is not configured, if the UE receives the first measurement instruction message sent by the base station (that is, step S302a8 is performed), the UE may perform step S401 (read the flag bit on the UE). When the flag bit is the first value, the UE may determine that the UE currently uses the LAA technology. In this case, the UE may send the first event to the base station, to disable the LAA technology.

In this implementation, the base station may be unable to configure an SCell, to achieve an effect of disabling the LAA technology.

The second threshold may be set according to an actual use requirement. This is not limited in this embodiment of this application.

In this implementation, the signal quality of the neighboring cell may be obtained by measuring RSRP of the neighboring cell or RSRQ of the neighboring cell.

In the third optional implementation, the status of using the LAA technology by the UE may be that the SCell is not configured. The first event is used to indicate that signal quality of a first cell is lower than a first threshold. The first cell is a serving cell of the LAA technology. It can be understood that the first cell is a serving cell of the LAA technology on the unlicensed spectrum.

For example, as shown in FIG. 6A and FIG. 6B, in the method for using a radio access technology provided in this embodiment of this application, when the status of using the LAA technology by the UE is that the SCell is not configured, step S302 that "the UE triggers a first event to indicate that a base station is unable to configure an SCell, or to instruct the base station to delete the configured SCell, so as to disable the LAA technology" shown in FIG. 3 may be specifically implemented by a process shown in the following steps S302a10 to S302a17.

S302a10. The base station configures the first cell as an SCell.

S302a11. The base station sends a second configuration message to the UE.

The second configuration message is used to indicate that the first cell has been configured as the SCell.

S302a12. The UE receives the second configuration message sent by the base station.

After the UE receives the second configuration message sent by the base station, the UE may determine that the base station has configured the first cell as the SCell.

S302a13. The base station sends a second measurement instruction message to the UE.

The second measurement instruction message is used to instruct the UE to measure signal quality of the SCell.

S302a14. The UE receives the second measurement instruction message sent by the base station.

S302a15. The UE sends the first event to the base station.

It should be noted that in this implementation, the base station configures the first cell as the SCell, and therefore the signal quality of the first cell that is obtained by the UE through measurement is the signal quality of the SCell that is obtained by the UE through measurement. In this case, the first event sent by the UE to the base station is used to indicate that the signal quality of the SCell is lower than the first threshold. Therefore, it can be understood that in an LTE system, the first event in this implementation may be an A2 event.

S302a16. The base station receives the first event sent by the UE.

S302a17. The base station deletes the SCell based on the first event, to disable the LAA technology.

It can be understood that when the UE determines to use the Wi-Fi 5G technology (that is, step S301 is performed) and the status of using the LAA technology by the UE is that the SCell is not configured, the UE may perform step S401 (read the flag bit on the UE). When the flag bit is the first value, the UE may determine that the UE currently uses the LAA technology. In this case, if the UE receives the second configuration message sent by the base station (that is, step S302a12 is performed), and receives the second measurement instruction message sent by the base station (that is, step S302a14 is performed), the UE may send the first event to the base station, to disable the LAA technology.

Optionally, the UE may alternatively perform step S401 after receiving the second configuration message sent by the base station (that is, step S302a12 is performed), and receiving the second measurement instruction message sent by the base station (that is, step S302a14 is performed). Specifically, when the UE determines to use the Wi-Fi 5G technology (that is, step S301 is performed) and the status of using the LAA technology by the UE is that the SCell is not configured, if the UE receives the second configuration message sent by the base station (that is, step S302a12 is performed), and receives the second measurement instruction message sent by the base station (that is, step S302a14 is performed), the UE may perform step S401 (read the flag bit on the UE). When the flag bit is the first value, the UE may determine that the UE currently uses the LAA technology. In this case, the UE may send the first event to the base station, to disable the LAA technology.

It can be understood that in the LTE system, if the status of using the LAA technology by the UE is that the SCell is not configured, the UE may wait for the base station to configure an SCell. In a process of configuring an SCell by the base station, the base station first configures the first cell as the SCell, and then instructs the UE to measure the SCell. When the signal quality of the SCell is lower than the first threshold, the UE sends the result of measuring the signal quality of the SCell by the UE to the base station.

In this implementation, regardless of whether the UE measures the SCell, or regardless of whether the signal quality of the SCell that is obtained by the UE through measurement satisfies a sending condition of the first event (namely, the A2 event), the UE sends the first event to the base station, to indicate that the signal quality of the SCell is lower than the first threshold, that is, the SCell is no longer suitable for acting as a serving cell due to deterioration of the signal quality. After the base station receives the first event sent by the UE, the base station may determine, based on the first event, that the serving cell needs to be switched. In this case, the base station deletes the SCell.

In this implementation, the base station may delete the SCell to achieve an effect of disabling the LAA technology.

For details about descriptions of the first threshold and the signal quality of the configured SCell, refer to the related descriptions of the first threshold and the signal quality of the configured SCell in the first optional implementation. Details are not described herein again.

In this embodiment of this application, both the second optional implementation and the third optional implementation are implementations when the status of using the LAA technology by the UE is that the SCell is not configured. Therefore, in an actual implementation process, one of the second optional implementation and the third optional implementation may be performed. To clearly illustrate how to perform one of the second optional implementation and the third optional implementation, dashed-line boxes are used in FIG. 6A and FIG. 6B to illustrate steps S302a10 to 302a17 in the third optional implementation.

It should be noted that the LAA technology mentioned in this embodiment of this application is described by using the LTE system as an example. In a specific implementation, in future 5G NR (a new radio access technology in the 3GPP), the LAA technology, the A2 event, and the A4 event may be also applicable; or the LAA technology, the A2 event, and the A4 event may be replaced with other names with same meanings. It can be understood that the radio access technologies listed in this embodiment of this application are merely examples, and any other radio access technologies that have same or similar meanings but different names as the radio access technologies listed in this embodiment of this application also fall within the protection scope of this application.

Figure 7:
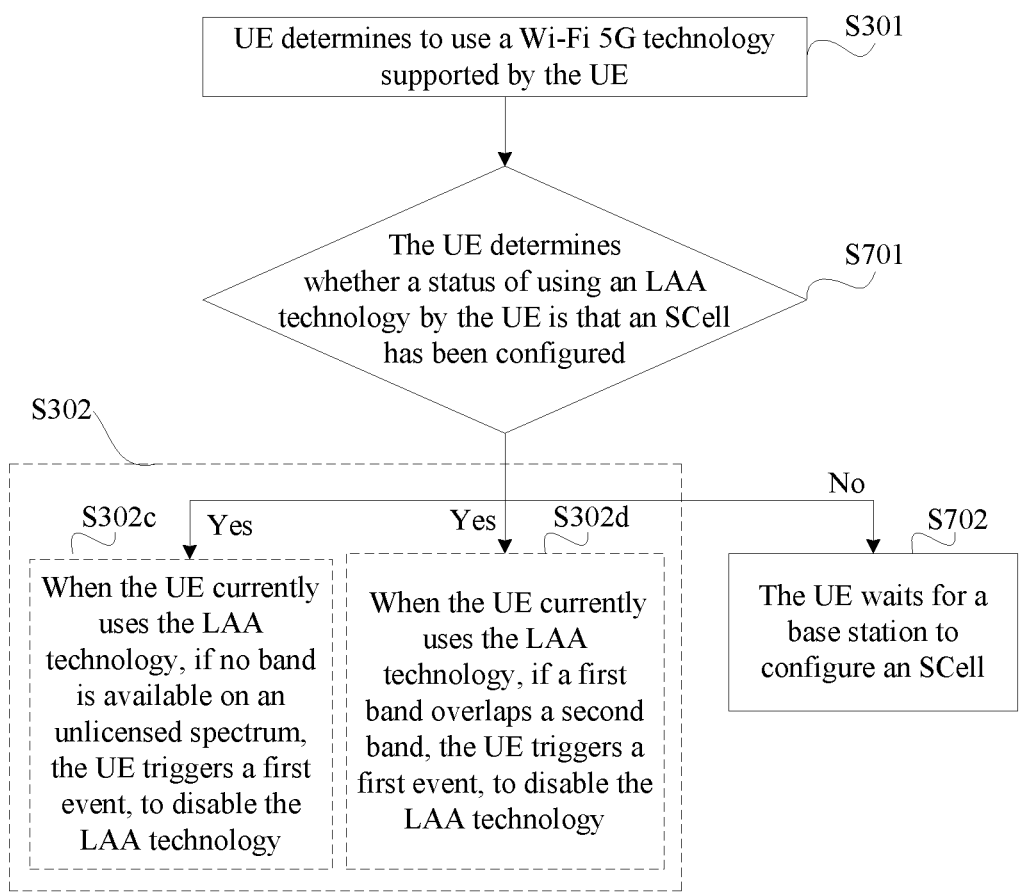
FIG. 7 is a schematic diagram 3 of a method for using a radio access technology according to an embodiment of this application.

Optionally, with reference to FIG. 3, as shown in FIG. 7, after step S301 and before step S302, the method for using a radio access technology provided in this embodiment of this application may further include the following step S701.

S701. The UE determines whether the status of using the LAA technology by the UE is that the SCell has been configured.

In this embodiment of this application, when the UE determines that the status of using the LAA technology by the UE is that the SCell has been configured (including that the SCell has been configured but not activated and that the SCell has been configured and activated), as shown in FIG. 7, step S302 shown in FIG. 3 may be specifically the following step S302c or S302d. When the UE determines that the status of using the LAA technology by the UE is that the SCell is not configured, as shown in FIG. 7, the UE may continue to perform the following step S702.

S302c. When the UE currently uses the LAA technology, the UE triggers a first event when no band is available on the unlicensed spectrum, to disable the LAA technology.

In this embodiment of this application, when the UE determines to use the Wi-Fi 5G technology, if the UE determines that the status of using the LAA technology by the UE is that the SCell has been configured, the UE may determine whether a band is available on the unlicensed spectrum. In one aspect, when a band is available on the unlicensed spectrum (that is, the band is not in use), the UE may transmit a service on the available band by using the Wi-Fi 5G technology. In this way, services are transmitted on different bands on the unlicensed spectrum by using the Wi-Fi 5G technology and the LAA technology, thereby ensuring that no mutual interference occurs when the UE transmits services by using the Wi-Fi 5G technology and the LAA technology. In another aspect, when no band is available on the unlicensed spectrum, the UE triggers the first event to disable the LAA technology, thereby ensuring that the UE transmits a service preferentially by using the Wi-Fi 5G technology. Specifically, for a method for triggering, by the UE, to disable the LAA technology, refer to the method for disabling the LAA technology in FIG. 3 or FIG. 6A and FIG. 6B. Details are not described herein again.

S302d. When the UE currently uses the LAA technology, the UE triggers a first event when a first band overlaps a second band, to disable the LAA technology.

The first band is a band used by the Wi-Fi 5G technology on the unlicensed spectrum. The second band is a band used by the LAA technology on the unlicensed spectrum.

It should be noted that overlapping between the first band and the second band includes complete overlapping and partial overlapping, that is, the first band may completely or partially overlap the second band.

In this embodiment of this application, when the UE determines to use the Wi-Fi 5G technology and the UE has transmitted a service by using the Wi-Fi 5G technology, if the UE determines that the status of using the LAA technology by the UE is that the SCell has been configured, the UE may determine whether the first band overlaps the second band. In one aspect, when the first band completely does not overlap the second band, the UE may continue to transmit a service by using the Wi-Fi 5G technology. In another aspect, when the first band overlaps the second band, after the UE triggers the first event, it can be ensured that the UE transmits a service preferentially by using the Wi-Fi 5G technology. Specifically, for a method for triggering, by the UE, to disable the LAA technology, refer to the method for disabling the LAA technology in FIG. 3 or FIG. 6A and FIG. 6B. Details are not described herein again.

It can be understood that in this embodiment of this application, in an actual implementation process, the UE may perform one of steps S302c and S302d, that is, the UE may perform step S302c or step S302d. To clearly illustrate how the UE performs one of steps S302c and S302d, step S302d is illustrated by a dashed-line box in FIG. 7.

S702. The UE waits for the base station to configure an SCell.

For details about descriptions of step S702, refer to the related descriptions in the method shown in FIG. 6A and FIG. 6B in the foregoing embodiment. Details are not described herein again.

Still with reference to the three scenarios (1), (2), and (3) in the foregoing embodiment, the following describes an example of the method shown in FIG. 7.

It is assumed that a band of 5 GHz is denoted as B46, B46 may be divided into four subbands: B46a, B46b, B46c, and B46d, B46a and B46b are adjacent, B46b and B46c are adjacent, and B46c and B46d are adjacent. In this case, in this embodiment of this application, the Wi-Fi 5G technology and the LAA technology may be controlled for transmitting services on different subbands of the band of 5 GHz, thereby achieving coexistence of the Wi-Fi 5G technology and the LAA technology, that is, ensuring that no mutual interference occurs when the UE transmits services by using the Wi-Fi technology and the LAA technology.

Figure 8:
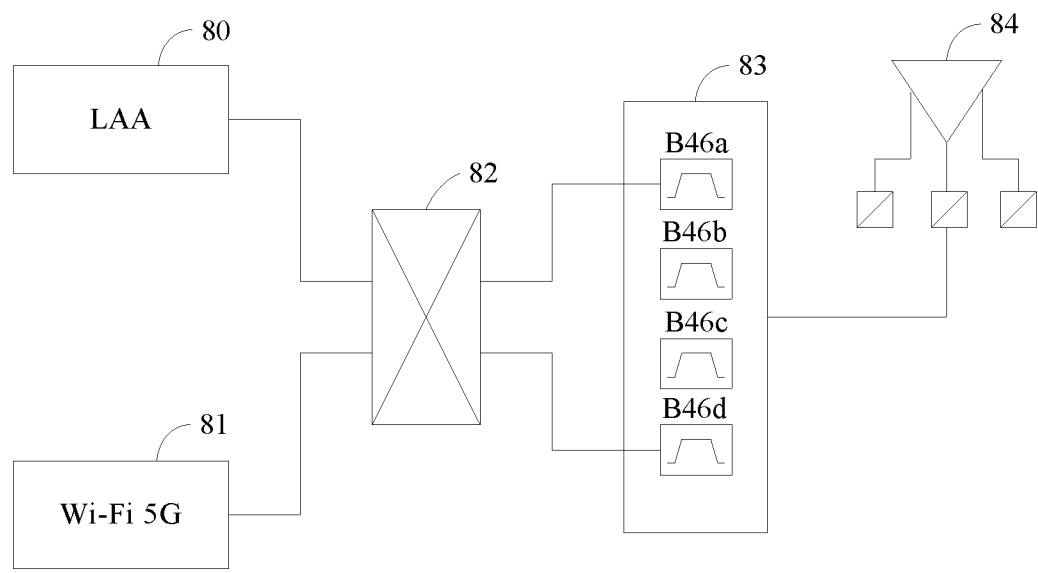
FIG. 8 is a schematic diagram of radio frequency (radio frequency, RF)-based hardware on which a Wi-Fi 5G technology and an LAA technology coexist according to an embodiment of this application.

FIG. 8 is a schematic diagram of RF-based hardware on which a Wi-Fi 5G technology and an LAA technology coexist according to an embodiment of this application. As shown in FIG. 8, 80 indicates the LAA technology, 81 indicates the Wi-Fi 5G technology, 82 indicates a logical switch, 83 indicates a filter, and 84 indicates an antenna. In this embodiment of this application, the filter 83 may be a multi-functional hybrid filter, which may use, as common subbands, a subband (for example, B46a shown in FIG. 8) used by the LAA technology and a subband (for example, B46d shown in FIG. 8) used by the Wi-Fi 5G technology, to implement an effect of simultaneously selecting at least two of a plurality of subbands, so that the plurality of subbands can work simultaneously without mutual impact. As shown in FIG. 8, the logical switch 82 may be used to control the filter 83 to select two non-adjacent subbands (mutual interference may occur between adjacent subbands) from B46a, B46b, B46c, and B46d for the Wi-Fi 5G technology and the LAA technology, for example, select B46d for the Wi-Fi 5G technology and select B46a for the LAA technology, so as to simultaneously transmit services on different subbands by using the Wi-Fi 5G technology and the LAA technology, so that the Wi-Fi 5G technology and the LAA technology can coexist. B46b and B46c may be idle subbands.

For the three scenarios (1), (2), and (3) shown in the foregoing embodiment, the UE may determine, based on related information about using the LAA technology by the UE (for example, information such as a status, a frequency, and bandwidth of an SCell, of the UE, that uses the LAA technology), whether the SCell has been configured, and when the SCell has been configured, determine a subband on which the SCell is located.

When the SCell, of the UE, that uses the LAA technology has been configured (including that the SCell has been configured but not activated and that the SCell has been configured and activated), in the two scenarios (1) and (2) shown in the foregoing embodiment, if the UE determines to use the Wi-Fi 5G technology and the UE currently uses the LAA technology, the UE may select an unused subband from an available subband for the Wi-Fi 5G technology based on the subband on which the SCell, of the UE, that uses the LAA technology is located. For example, assuming that the subband on which the SCell, of the UE, that uses the LAA technology is located is B46a, the UE may select B46d for the Wi-Fi 5G technology, that is, the UE transmits a service on B46d by using the Wi-Fi 5G technology.

It should be noted that the foregoing descriptions are based on the following assumption as an example: When the UE enables a mobile hotspot for the Wi-Fi 5G technology, a channel of the mobile hotspot is automatically allocated by the UE. When the UE enables a mobile hotspot for the Wi-Fi 5G technology, if a user can manually select a channel of the mobile hotspot, the UE may display a list of candidate channels to the user, and delete a channel occupied by the LAA technology from the list. In this way, the user may directly select, according to an actual requirement of the user, a channel from the list for the Wi-Fi 5G technology for transmitting a service.

With reference to Table 1, by using subbands of various channels as examples, the following describes available subbands selected by the UE for the Wi-Fi 5G technology.

TABLE 1

| Subband on which an SCell using the LAA technology is located | Subband recommended for the Wi-Fi 5G technology |
|---|---|
| B46a | B46d and B46c |
| B46b | B46d |
| B46c | B46a |
| B46d | B46a and B46b |

For example, it can be learned from Table 1 that assuming that the subband on which the SCell using the LAA technology is located is B46c, because mutual interference may occur between adjacent subbands, the subband recommended for the Wi-Fi 5G technology may be B46a that is not adjacent to B46c.

In this embodiment of this application, when the UE uses the LAA technology, there may be a plurality of SCells, and different SCells may be located on different subbands. In this case, when the UE cannot select an available subband for the Wi-Fi 5G technology, for example, when no band is available on the unlicensed spectrum, the UE may choose to disable an SCell located on a specific subband, so that the subband becomes an available subband (for example, the UE may choose to disable a configured SCell with a smallest quantity of subbands or choose to disable a configured SCell with a subband with lowest total bandwidth); and then allocate the available subband to the Wi-Fi 5G technology for use. This can ensure that the UE properly transmits a service by using the Wi-Fi 5G technology.

When no SCell, of the UE, that uses the LAA technology is configured, in the three scenarios (1), (2), and (3) shown in the foregoing embodiment, in a case of the scenarios shown in (1) and (2), the UE may obtain, based on information such as a geographic location (for example, an identity of an LTE cell in which the UE is located) of the UE and a public land mobile network (public land mobile network, PLMN) identity that are stored in a historical record, a subband on which each SCell on which the UE historically camps is located, and then select, based on these subbands, another subband different from these subbands for the Wi-Fi 5G technology. If the UE cannot obtain the information such as the geographic location of the UE and the PLMN identifier that are stored in the historical record, the UE may perform the scenarios shown in (1) and (2) by directly using the Wi-Fi 5G technology according to a default procedure. In a case of the scenario shown in (3), in an implementation, when the UE is connected to an access point that uses the Wi-Fi 5G technology, because a channel of the access point is automatically allocated by the access point, in other words, the channel is not fixed, the UE cannot predict the channel. Therefore, the UE may perform the scenario shown in (3) by directly using the Wi-Fi 5G technology according to the default procedure. In another implementation, when the UE is connected to an access point that uses the Wi-Fi 5G technology, because a channel of the access point is automatically allocated by the access point, in other words, the channel is not fixed, it can be preferentially ensured that the UE can properly use the access point. In a process of using the access point by the UE, the UE may learn the channel, and then the UE calculates a subband on which the channel is located. In addition, the UE may traverse subbands on which all configured SCells are located. If a subband on which a specific SCell is located is the same as the subband on which the channel of the access point is located, the UE may trigger to disable the LAA technology, to ensure that the UE transmits a service preferentially by using the Wi-Fi 5G technology. Specifically, for a method for triggering, by the UE, to disable the LAA technology, refer to the method for disabling the LAA technology in FIG. 3 or FIG. 6A and FIG. 6B. Details are not described herein again.

By using Table 2 as an example, the following describes examples of the PLMN identifier, the identity of the LTE cell in which the UE is located, the subband on which each SCell on which the UE historically camps is located, and the subband selected by the UE for the Wi-Fi 5G technology.

TABLE 2

| PLMN identifier | Identity of the LTE cell in which the UE is located | Subband on which each SCell on which the UE historically camps is located | Subband selected by the UE for the Wi-Fi 5G technology |
| --- | --- | --- | --- |
| PLMN1 | ID1 | B46a | B46d |
| PLMN2 | ID2 | B46d | B46a |

For example, as shown in Table 2, when the PLMN identifier is PLMN1 and the identity of the LTE cell in which the UE is located is ID1, the subband, obtained by the UE, of the SCell on which the UE historically camps is B46a. In this case, the UE may select another subband different from B46a for the Wi-Fi 5G technology. For example, the UE may select B46d for the Wi-Fi 5G technology.

In this embodiment of this application, in a process of using the Wi-Fi 5G technology by the UE, if the base station starts to configure the SCell, of the UE, that uses the LAA technology, the UE may calculate, based on a channel used for the Wi-Fi 5G technology, a subband used for the Wi-Fi 5G technology. When the subband configured by the base station for the SCell is the same as the subband used for the Wi-Fi 5G technology, the UE may trigger to disable the LAA technology, to ensure that the UE transmits a service preferentially by using the Wi-Fi 5G technology. Specifically, for a method for triggering, by the UE, to disable the LAA technology, refer to the method for disabling the LAA technology in FIG. 3 or FIG. 6A and FIG. 6B. Details are not described herein again.

Optionally, the base station may configure a plurality of SCells according to the foregoing method, to ensure that a subband configured by the base station for each SCell is different from the subband used for the Wi-Fi 5G technology. This can ensure that no mutual interference occurs when the UE transmits services by using the Wi-Fi 5G technology and the LAA technology.

Optionally, in this embodiment of this application, after the UE disables the LAA technology, when the UE determines to no longer use the Wi-Fi 5G technology, the UE may re-enable the LAA technology. Specifically, after step S302, the method provided in this embodiment of this application may further include steps S801 and S802.

S801. The UE determines to no longer use the Wi-Fi 5G technology.

S802. The UE enables the LAA technology and uses the LAA technology.

In this embodiment of this application, that the UE enables the LAA technology may be understood as that the UE may continue to use the LAA technology.

For example, corresponding to the three scenarios (1), (2), and (3) shown in the foregoing embodiment, a scenario in which the UE determines to no longer use the Wi-Fi 5G technology, that is, the UE enables the LAA technology may include one of the following:

(4) The UE disables the mobile hotspot for the Wi-Fi 5G technology.

(5) The UE interrupts the P2P network connection established by the UE by using the Wi-Fi 5G technology.

(6) The UE is disconnected from the access point that uses the Wi-Fi 5G technology.

It can be understood that (4) is a scenario corresponding to (1), (5) is a scenario corresponding to (2), and (6) is a scenario corresponding to (3).

When the UE enables the LAA technology and uses the LAA technology, the UE may perform step S503, to set the flag bit from the second value to the first value, so that the flag bit may indicate that the UE currently uses the LAA technology (that is, the UE has enabled the LAA technology). In this way, when the UE re-determines to use the Wi-Fi 5G technology, the UE may read the flag bit being the first value, and may trigger a first event to indicate that the base station is unable to configure an SCell, or to instruct the base station to delete the configured SCell, so as to disable the LAA technology (that is, step S402 is performed).

S503. The UE sets the flag bit from the second value to the first value.

Regarding hardware implementation, when the AP of the UE determines to no longer use the Wi-Fi 5G technology, the AP may read the flag bit on the UE. When the AP uses the Wi-Fi 5G technology, the flag bit has been set to the second value. Therefore, the AP reads the flag bit being the second value (that is, the UE currently does not use the LAA technology, in other words, the LAA technology is disabled). In this case, the AP may send a command to instruct the baseband processor (which may be, for example, the modem processor in the mobile phone shown in FIG. 2) to enable the LAA technology, and the baseband processor performs an action of enabling the LAA technology. After the baseband processor performs the action of enabling the LAA technology, the flag bit may be set to the first value, to indicate that the LAA technology is enabled. In this way, when the AP of the UE re-determines to use the Wi-Fi 5G technology, the AP may read the flag bit being the first value, and may instruct the baseband processor to disable the LAA technology.

It can be understood that the UE has disabled the LAA technology after the UE performs step S302. In this case, the status of using the LAA technology by the UE is that the SCell is not configured. Specifically, in the first optional implementation, when the UE disables the LAA technology, the base station deletes the SCell, so that the status of using the LAA technology by the UE changes from that the SCell has been configured to that the SCell is not configured. In the second optional implementation and the third optional implementation, when disabling the LAA technology, the base station cannot configure an SCell; as a result, the status of using the LAA technology by the UE is that the SCell is not configured. To sum up, after step S801 and before the UE enables the LAA technology (S802), the status of using the LAA technology by the UE is that the SCell is not configured.

When the status of using the LAA technology by the UE is that the SCell is not configured, the UE may wait for the base station to configure an SCell, so as to disable the LAA technology. In a process of configuring an SCell by the base station, the base station may configure the SCell through non-blind configuration or blind configuration.

In an optional implementation of this embodiment of this application, if the base station configures the SCell through non-blind configuration, step S802 may be specifically implemented by a process shown in steps S302a4 to S302a8 in the second optional implementation and step S302a9'. That is, when the LAA technology is being enabled, step S302a9 in the second optional implementation may be replaced with step S302a9'.

S302a9'. The UE sends a result of measuring the signal quality of the neighboring cell by the UE to the base station, so that the base station configures the neighboring cell as an SCell, to enable the LAA technology.

It can be understood that in the LTE system, if the status of using the LAA technology by the UE is that the SCell is not configured, the UE may wait for the base station to configure an SCell. In a process of configuring an SCell by the base station, the base station first configures the first cell as the neighboring cell of the primary cell, and then instructs the UE to measure the neighboring cell. When the signal quality of the neighboring cell is higher than a second threshold, the UE sends the result of measuring the signal quality of the neighboring cell by the UE to the base station. In this embodiment of this application, that the signal quality of the neighboring cell is higher than the second threshold is denoted as an A4 event in the LTE system. Therefore, in this implementation, the UE may measure the neighboring cell, and when the signal quality of the neighboring cell that is obtained by the UE through measurement satisfies a sending condition of the A4 event, send the A4 event to the base station, so that the base station learns the signal quality of the neighboring cell, and uses the neighboring cell as a serving cell, that is, the base station configures the neighboring cell as an SCell.

It can be understood that when the UE determines to no longer use the Wi-Fi 5G technology (that is, step S801 is performed), if the UE receives the first measurement instruction message sent by the base station (that is, step S302a8 is performed), the UE may perform step S401 (read the flag bit on the UE). When the flag bit is the second value, the UE may perform step S302a9', to enable the LAA technology.

In this implementation, the base station may configure the SCell to achieve an effect of enabling the LAA technology.

In another optional implementation of this embodiment of this application, if the base station configures the SCell through blind configuration, step S802 may be specifically implemented by a process shown in steps S302a10 to S302a14 in the third optional implementation and steps S302a15' to S302a17'. That is, when the LAA technology is being enabled, steps S302a15 to S302a17 in the third optional implementation may be replaced with steps S302a15' to S302a17'.

S302a15'. The UE measures the signal quality of the SCell.

S302a16'. When the signal quality of the SCell is higher than or equal to the first threshold, the UE sends the result of measuring the signal quality of the SCell by the UE to the base station.

S302a17'. The base station receives the measurement result sent by the UE and configures the SCell.

It can be understood that when the UE determines to no longer use the Wi-Fi 5G technology (that is, step S801 is performed), if the UE receives the second configuration message sent by the base station (that is, step S302a12 is performed), and receives the second measurement instruction message sent by the base station (that is, step S302a14 is performed), the UE may perform step S401 (read the flag bit on the UE). When the flag bit is the second value, the UE may perform step S302a15', to enable the LAA technology.

It can be understood that in the LTE system, if the status of using the LAA technology by the UE is that the SCell is not configured, the UE may wait for the base station to configure an SCell. In a process of configuring an SCell by the base station, the base station first configures the first cell as the SCell, and then instructs the UE to measure the SCell. The UE measures the SCell. When the signal quality of the SCell is higher than or equal to the first threshold, the UE sends the result of measuring the signal quality of the SCell by the UE to the base station. Because the signal quality of the SCell is higher than or equal to the first threshold, it indicates that the SCell may serve as a serving cell. In this case, the UE may configure the SCell, to enable the LAA technology.

In this implementation, the base station may configure the SCell to achieve an effect of enabling the LAA technology.

In this embodiment of this application, the base station may configure the SCell, to achieve an effect of enabling the LAA technology for the UE, and the UE does not need to first detach from the LTE system and then re-attach to the LTE system. In a process of re-attaching to the LTE system by the UE, when the UE reports a capability of the UE to the eNB, an LAA capability and an LAA-related CA combination may be added to enable the LAA technology. Therefore, when the UE enables the LAA technology, the UE may still properly perform cellular communication in the primary cell on the licensed spectrum, that is, the UE is not disconnected from the licensed spectrum. In this way, when the UE supports both the Wi-Fi 5G technology and the LAA technology, service continuity can be ensured for the UE when the UE switches from the Wi-Fi 5G technology to the LAA technology.

The foregoing embodiments describe the solutions provided in the embodiments of this application mainly from a perspective of the UE. It can be understood that to implement the foregoing functions, the UE provided in the embodiments of this application include corresponding hardware structures and/or software modules for performing the functions. A person of ordinary skill in the art may easily be aware that, in combination with the examples described in the embodiments disclosed in this specification, modules, algorithms, and steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, for example, the UE and the like may be divided into functional modules according to the foregoing method. For example, the functional modules may be divided based on the functions, or at least two functions may be integrated in one module. The integrated module may be implemented in a form of hardware, or may be implemented in a form of a software functional module. It should be noted that, in the embodiments of this application, module division is an example, and is merely a logical function division. In actual implementation, another division manner may be used.

Figure 9:
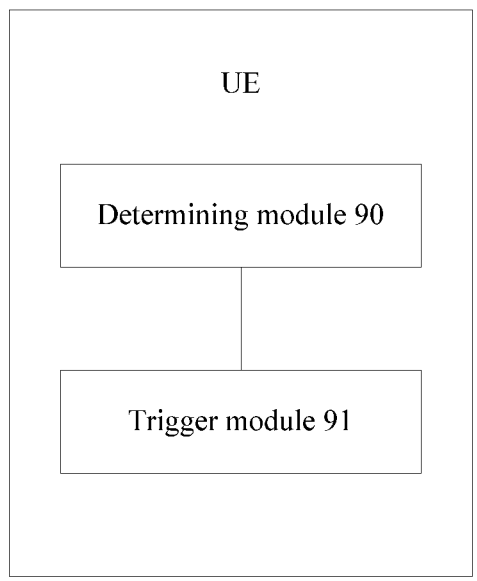
FIG. 9 is a schematic structural diagram 1 of UE according to an embodiment of this application.

When the functional modules are divided based on the functions, FIG. 9 is a possible schematic structural diagram of UE according to an embodiment of this application. As shown in FIG. 9, the UE may include a determining module 90 and a trigger module 91.

The determining module 90 may be configured to support the UE in performing steps S301 (including step S301a or S301b) and S801 that are performed by the UE in the foregoing method embodiment, and/or other processes of the technologies described in the specification.

The trigger module 91 may be configured to support the UE in performing steps S302, S402, S302a1, S302a6, S302a8, S302a9, S302a12, S302a14, S302a15, S302c, S302d, S302a9', S302a15', and S302a16', and the operation of "enabling the LAA technology" in step S802 that are performed by the UE in the foregoing method embodiment, and/or other processes of the technologies described in the specification.

Optionally, in this embodiment of this application, the UE may further include a reading module. The reading module may be configured to support the UE in performing step S401 that is performed by the UE in the foregoing method embodiment, and/or other processes of the technologies described in the specification.

Optionally, in this embodiment of this application, the UE may further include a setting module. The setting module may be configured to support the UE in performing steps S502 and S503 that are performed by the UE in the foregoing method embodiment, and/or other processes of the technologies described in the specification.

Optionally, in this embodiment of this application, the UE may further include a judgment module. The judgment module may be configured to support the UE in performing steps S601 and S701 that are performed by the UE in the foregoing method embodiment, and/or other processes of the technologies described in the specification.

Optionally, in this embodiment of this application, the UE may further include a waiting module. The waiting module is configured to support the UE in performing step S702 that is performed by the UE in the foregoing method embodiment, and/or other processes of the technologies described in the specification.

Optionally, in this embodiment of this application, the UE may further include a use module. The use module is configured to support the UE in performing the operation of "using the LAA technology" in step S802, and step S501 that are performed by the UE in the foregoing method embodiment, and/or other processes of the technologies described in the specification.

It can be understood that the foregoing functional modules may further perform other processes of the technologies described in the embodiments of this application. For function descriptions of corresponding functional modules, refer to all related content of the steps included in the foregoing method embodiment. Details are not described herein again.

Figure 10:
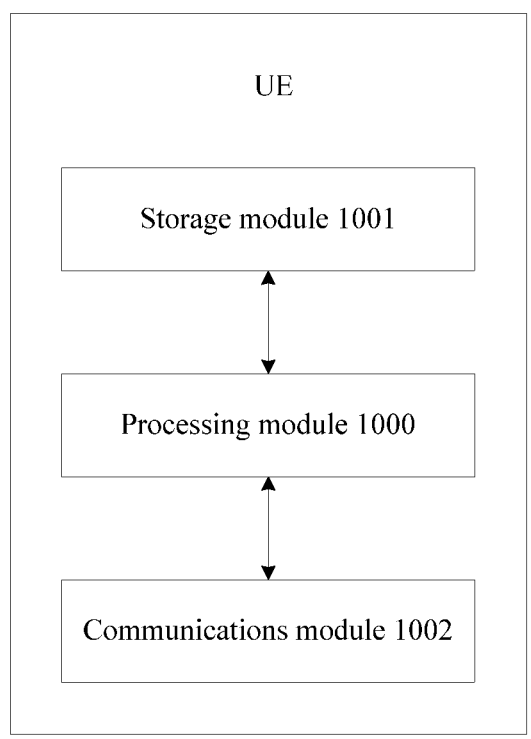
FIG. 10 is a schematic structural diagram 2 of UE according to an embodiment of this application.

When integrated functional modules are used, FIG. 10 is a possible schematic structural diagram of UE according to an embodiment of this application. As shown in FIG. 10, the UE may include a processing module 1000, a storage module 1001, and a communications module 1002.

The processing module 1000 may be configured to control and manage an action of the UE. For example, the processing module 1000 may be configured to support the UE in performing steps S301 (including step S301a or S301b), S302, S302c, S302d, S401-S402, S501-S503, S601, S701, S702, S801-S802, and S302a15' that are performed by the UE in the foregoing method embodiment, and/or other processes of the technologies described in the specification.

The storage module 1001 is configured to store program code and data of the UE. The storage module 1001 may be further configured to store the flag bit.

The communications module 1002 may be configured to support the UE in communicating with another device. For example, the communications module 1002 may be configured to support the UE in interacting with a base station. In this embodiment of this application, the communications module 1002 may be configured to support the UE in performing steps S302a1, S302a6, S302a8, S302a12, S302a14, S302a15, S302a9', and S302a16' that are performed by the UE in the foregoing method embodiment, and/or other processes of the technologies described in the specification.

The processing module 1000 may be a processor or a controller, for example, may be a central processing unit (central processing unit, CPU), a general purpose processor, a digital signal processor (digital signal processor, DSP), an application-specific integrated circuit (application-specific integrated circuit, ASIC), a field programmable gate array (field programmable gate array, FPGA), or another programmable logic device, a transistor logic device, a hardware component, or any combination thereof. The controller/processor may implement or execute various example logical blocks, modules, and circuits described with reference to content disclosed in the present invention. Alternatively, the processor may be a combination of processors implementing a computing function, for example, a combination of one or more microprocessors, or a combination of the DSP and a microprocessor. The storage module 1001 may be a memory. The memory may include a general memory and an internal storage. The general memory is configured to store a software program and/or a module of the UE. The internal storage is configured to load the processor and run the software program of the UE. The communications module 1002 may be a transceiver, a transceiver circuit, a communications interface, or the like.

For example, the processing module 1000 may be the processor 10 shown in FIG. 2. The storage module 1001 may be the memory 13 shown in FIG. 2. The communications module 1002 may be a radio frequency circuit, for example, the RF circuit 11 and/or the input module 14 shown in FIG. 2. The communications module 1002 may include not only the radio frequency circuit, but also a Wi-Fi module and a Bluetooth module. Communications modules such as the radio frequency circuit, the Wi-Fi module, and the Bluetooth module may be collectively referred to as a transceiver or a communications interface.

When the processing module 1000 is the processor, the storage module 1001 is the memory, and the communications module 1002 is the radio frequency circuit, the UE provided in this embodiment of this application may be the mobile phone shown in FIG. 2 or another terminal having the foregoing devices. The processor, the transceiver, and the memory may be coupled together through a bus. The bus 53 may be a peripheral component interconnect (peripheral component interconnect, PCI) bus, an extended industry standard architecture (extended industry standard architecture, EISA) bus, or the like. The bus may be classified into an address bus, a data bus, a control bus, and the like.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a magnetic disk, or a magnetic tape), an optical medium (for example, a digital video disc (digital video disc, DVD)), a semiconductor medium (for example, a solid state drive (solid state drives, SSD)), or the like.

The foregoing descriptions about implementations allow a person skilled in the art to understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or some of the functions described above. For a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, a network device, or the like) to perform all or some of the steps of the methods described in the embodiments of this application. The foregoing storage medium includes: any medium that can store program code, such as a flash memory, a removable hard disk, a read-only memory, a random access memory, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method for using a radio access technology, the method comprising
   determining, by a user equipment (UE), to use a first radio access technology; and
   triggering, by the UE, a first event to disable a second radio access technology while the UE currently uses the second radio access technology,
   wherein the first event indicates that a base station fails to configure a secondary cell or instructs the base station to delete a configured secondary cell,
   the secondary cell is a secondary cell of the second radio access technology on an unlicensed spectrum,
   the UE is configured to support the first radio access technology and the second radio access technology, the first radio access technology and the second radio access technology are configured to use the unlicensed spectrum, and the second radio access technology is a carrier aggregation technology configured to use the unlicensed spectrum,
   wherein after the determining, by the UE, to use the first radio access technology and before the triggering, by the UE, the first event, the method further comprises:
   determining, by the UE, a status of the UE using the second radio access technology.

2. The method according to claim 1, wherein
   the triggering, by the UE, the first event comprises:
   triggering, by the UE, the first event based on the status of the UE using the second radio access technology.

3. The method according to claim 2, wherein the status of the UE using the second radio access technology includes:
   the secondary cell has been configured by the UE and is not activated,
   the secondary cell has been configured by the UE and is activated, or
   the secondary cell is not configured by the UE.

4. The method according to claim 3, wherein
   the status of the second radio access technology includes the secondary cell has been configured by the UE and is not activated, or the secondary cell has been configured by the UE and is activated;
   the first event indicates that a signal quality of the secondary cell is lower than a first threshold; and
   the triggering, by the UE, the first event based on the status of the US using the second radio access technology comprises:
   sending, by the UE, the first event to the base station thereby causing the base station to delete the secondary cell in response to the status of the second radio access technology including the secondary cell has been configured by the UE and is not activated, or the secondary cell has been configured by the UE and is activated.

5. The method according to claim 3, wherein
   the status of the second radio access technology includes the secondary cell is not configured by the UE,
   the first event indicates that the UE prohibits sending a result of measuring a first cell by the UE to the base station, and
   the first cell is a serving cell of the second radio access technology; and
   the triggering, by the UE, the first event based on the status of the UE using the second radio access technology comprises:
   receiving, by the UE, a first configuration message sent by the base station in response to the status of the second radio access technology including the secondary cell is not configured by the UE, wherein the first configuration message indicates that the first cell has been configured as a neighboring cell of a primary serving cell, among serving cells of the second radio access technology, on which the UE currently camps, and the first cell is different from the primary serving cell;
   receiving, by the UE, a first measurement instruction message sent by the base station, wherein the first measurement instruction message instructs the UE to measure a signal quality of the neighboring cell; and
   prohibiting the UE from sending a result of measuring the signal quality of the neighboring cell to the base station thereby causing the base station being unable to configure the neighboring cell as the secondary cell.

6. The method according to claim 3, wherein
   the status of the second radio access technology includes the secondary cell is not configured by the UE,
   the first event indicates that a signal quality of a first cell is lower than a first threshold, and
   the first cell is a serving cell of the second radio access technology; and
   the triggering, by the UE, the first event based on the status of the UE using the second radio access technology comprises:
   receiving, by the UE, a second configuration message sent by the base station in response to the status of the second radio access technology including the secondary cell is not configured by the UE, wherein the second configuration message indicates that the first cell has been configured as the secondary cell;
   receiving, by the UE, a second measurement instruction message sent by the base station, wherein the second measurement instruction message instructs the UE to measure a signal quality of the secondary cell; and
   sending, by the UE, the first event to the base station thereby causing the base station to delete the secondary cell.

7. The method according to claim 1, wherein the triggering, by the UE, the first event to disable the second radio access technology comprises:
   reading, by the UE, a flag bit on the UE; and
   triggering, by the UE, the first event in response to the flag bit being a first value, wherein
   the flag bit being the first value indicates that the UE is currently using the second radio access technology.

8. The method according to claim 7, wherein after the triggering, by the UE, the first event to disable the second radio access technology, the method further comprises:
   using, by the UE, the first radio access technology; and
   setting, by the UE, the flag bit to a second value, wherein the flag bit being the second value indicates that the UE is currently using the first radio access technology.

9. The method according to claim 1, wherein the determining, by the UE, to use the first radio access technology comprises:
   determining, by the UE according to a current service requirement of the UE, to use the first radio access technology; or
   determining, by the UE based on a selection operation of a user, to use the first radio access technology.

10. The method according to claim 1, wherein
    after the determining, by the UE, to use the first radio access technology and before the triggering, by the UE, the first event, the method further comprises:

determining, by the UE, that the secondary cell has been configured; and the triggering, by the UE, the first event comprises:
triggering, by the UE, the first event in response to the unlicensed spectrum failing to include an available band; or
triggering, by the UE, the first event in response to a first band overlapping a second band, wherein the first band is used by the first radio access technology on the unlicensed spectrum, and the second band is used by the second radio access technology on the unlicensed spectrum.

11. A user equipment (UE), comprising:
a processor,
a memory coupled to the processor, and
a communications interface coupled to the processor and configured to communicate with another device, the memory having one or more computer programs stored thereon that in response to being executed by the processor,
cause the processor to:
determine to use a first radio access technology, and
trigger a first event to disable a second radio access technology while the UE currently uses the second radio access technology, wherein the first event indicates that a base station fails to configure a secondary cell or instructs the base station to delete the configured secondary cell, and the secondary cell is a secondary cell of the second radio access technology on an unlicensed spectrum,
wherein the UE is configured to support the first radio access technology and the second radio access technology, the first radio access technology and the second radio access technology are configured to use the unlicensed spectrum, the second radio access technology is a carrier aggregation technology configured to use the unlicensed spectrum, and
wherein the processor is further configured to after determining to use the first radio access technology and before triggering the first event, determine a status of the communications interface using the second radio access technology.

12. The UE according to claim 11, wherein
the processor configured to trigger the first event comprises:
the processor being further configured to trigger the first event based on the status of the communications interface using the second radio access technology.

13. The UE according to claim 12, wherein the status of the communications interface using the second radio access technology includes:
the secondary cell has been configured by the UE, and is not activated,
the secondary cell has been configured by the UE and is activated, or
the secondary cell is not configured by the UE.

14. The UE according to claim 13, wherein
the status of the second radio access technology includes the secondary cell has been configured by the UE, and is not activated or the secondary cell has been configured by the UE and is activated, and
the first event indicates that a signal quality of the secondary cell is lower than a first threshold; and
wherein the processor configured to trigger the first event based on the status of the communications interface using the second radio access technology comprises:
the processor being further configured to send the first event to the base station thereby causing the base station to delete the secondary cell in response to the status of the second radio access technology including the secondary cell has been configured by the UE and is not activated or the secondary cell has been configured by the UE and is activated.

15. The UE according to claim 13, wherein
the status of the second radio access technology includes the secondary cell is not configured by the UE,
the first event indicates that the communications interface prohibits sending a result of measuring a first cell to the base station, and
the first cell is a serving cell of the second radio access technology;
the processor is further configured to:
receive a first configuration message sent by the base station in response to the status of the second radio access technology including the secondary cell is not configured by the UE, wherein the first configuration message indicates that the first cell has been configured as a neighboring cell of a primary serving cell, among serving cells of the second radio access technology, on which the UE currently camps, and the first cell is different from the primary serving cell;
receive a first measurement instruction message sent by the base station, wherein the first measurement instruction message instructs the UE to measure a signal quality of the neighboring cell; and
prohibit the UE from sending a result of measuring the signal quality of the neighboring cell to the base station thereby causing the base station being unable to configure the neighboring cell as the secondary cell.

16. The UE according to claim 13, wherein
the status of the second radio access technology includes the secondary cell is not configured by the UE,
the first event indicates that a signal quality of a first cell is lower than a first threshold, and
the first cell is a serving cell of the second radio access technology;
the processor is further configured to:
receive a second configuration message sent by the base station in response to the status of the second radio access technology including the secondary cell is not configured by the UE, wherein the second configuration message indicates that the first cell has been configured as the secondary cell;
receive a second measurement instruction message sent by the base station, wherein the second measurement instruction message instructs the UE to measure a signal quality of the secondary cell; and
send the first event to the base station thereby causing the base station to delete the secondary cell.

17. The UE according to claim 11, wherein the processor configured to trigger the first event to disable the second radio access technology comprises:
the processor being further configured to:
read a flag bit on the UE, and
trigger the first event in response to reading the flag bit being a first value, wherein the flag bit being the first value indicates that the second radio access technology is currently used.

18. The UE according to claim 17, wherein the processor is further configured to:

use the first radio access technology after triggering the first event, and set the flag bit to a second value, wherein the flag bit being the second value indicates that the UE currently uses the first radio access technology.

19. The UE according to claim 11, wherein the processor is further configured to, after determining to use the first radio access technology and before triggering the first event, determine that the secondary cell has been configured; and the processor being configured to trigger the first event comprises the processor being further configured to:
   trigger the first event in response to the unlicensed spectrum failing to include an available band; or
   trigger the first event in response to a first band overlapping a second band, wherein the first band is used by the first radio access technology on the unlicensed spectrum, and the second band is used by the second radio access technology on the unlicensed spectrum.

20. A non-transitory computer readable storage medium, wherein the non-transitory computer readable storage medium comprises computer instructions, and when the computer instructions are run on a user equipment (UE), the UE is configured to:

determine to use a first radio access technology; and trigger a first event to disable a second radio access technology while the UE currently uses the second radio access technology, wherein the first event indicates that a base station fails to configure a secondary cell or instructs the base station to delete a configured secondary cell, and the secondary cell is a secondary cell of the second radio access technology on an unlicensed spectrum, wherein the UE is further configured to after determining to use the first radio access technology and before triggering the first event, determine a status of the UE using the second radio access technology.

* * * * *